(12) United States Patent
Bhogal

(10) Patent No.: US 10,739,013 B2
(45) Date of Patent: Aug. 11, 2020

(54) TAILORED FOOD PREPARATION WITH AN OVEN

(71) Applicant: June Life, Inc., San Francisco, CA (US)

(72) Inventor: Nikhil Bhogal, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 121 days.

(21) Appl. No.: 16/005,491

(22) Filed: Jun. 11, 2018

(65) Prior Publication Data

US 2018/0292092 A1 Oct. 11, 2018

Related U.S. Application Data

(63) Continuation-in-part of application No. 15/450,546, filed on Mar. 6, 2017, now Pat. No. 10,024,544, (Continued)

(51) Int. Cl.

| | |
|---|---|
| A23L 5/10 | (2016.01) |
| F24C 7/08 | (2006.01) |
| H05B 1/02 | (2006.01) |
| F24C 3/12 | (2006.01) |
| A47J 37/06 | (2006.01) |

(Continued)

(52) U.S. Cl.
CPC ............ *F24C 7/086* (2013.01); *A23L 5/10* (2016.08); *A23L 5/15* (2016.08); *A23L 5/17* (2016.08); *A47J 37/0664* (2013.01); *F24C 3/124* (2013.01); *F24C 7/085* (2013.01); *F24C 7/087* (2013.01); *H05B 1/0263* (2013.01);
(Continued)

(58) Field of Classification Search
CPC ....................................................... F24C 15/08
USPC ................................... 126/198, 369; 99/325
See application file for complete search history.

(56) References Cited

U.S. PATENT DOCUMENTS

| | | |
|---|---|---|
| 605,216 A | 6/1898 | Boddam |
| 5,360,965 A | 11/1994 | Ishii et al. |

(Continued)

FOREIGN PATENT DOCUMENTS

| | | |
|---|---|---|
| CN | 1900858 A | 1/2007 |
| CN | 101504158 A | 8/2009 |

(Continued)

OTHER PUBLICATIONS

"Electrolux launches CombiSteam Pro Smart", http://www.homeappliancesworld.com/2018/03/08/electrolux-launches-combisteam-pro-smart/, downloaded from internet on Jan. 18, 2019, 2 pages.
(Continued)

*Primary Examiner* — Avinash A Savani
(74) *Attorney, Agent, or Firm* — Jeffery Schox; Diana Lin

(57) ABSTRACT

A method for operating a connected oven based on subjective user feedback, wherein the connected oven includes a set of in-cavity sensors configured to monitor the foodstuff throughout a cooking session; the method comprising: executing a cooking session according to an initial set of operation instructions to achieve a target food output condition; collecting subjective feedback values from the user for the resulting food output condition of the foodstuff after the cooking session; and updating the initial set of operation instructions based on the feedback values from the user.

19 Claims, 23 Drawing Sheets

Related U.S. Application Data which is a continuation of application No. 15/147,597, filed on May 5, 2016, now Pat. No. 9,644,847.

(60) Provisional application No. 62/157,325, filed on May 5, 2015, provisional application No. 62/517,520, filed on Jun. 9, 2017.

(51) Int. Cl.
　　*F24C 15/00*　　　　(2006.01)
　　*H04W 4/80*　　　　(2018.01)
　　*F24C 7/06*　　　　(2006.01)

(52) U.S. Cl.
　　CPC .......... *A23V 2002/00* (2013.01); *F24C 7/062* (2013.01); *F24C 15/008* (2013.01); *H04W 4/80* (2018.02)

(56) References Cited

U.S. PATENT DOCUMENTS

| | | | |
|---|---|---|---|
| 5,546,475 | A | 8/1996 | Bolle et al. |
| 6,310,964 | B1 | 10/2001 | Mohan et al. |
| 6,856,247 | B1 * | 2/2005 | Wallace ................ G01K 1/026 340/539.16 |
| 6,862,494 | B2 | 3/2005 | Hu et al. |
| 7,013,661 | B2 | 3/2006 | Gatling et al. |
| 7,102,107 | B1 | 9/2006 | Chapman |
| 7,150,891 | B2 | 12/2006 | Greiner et al. |
| 7,663,502 | B2 | 2/2010 | Breed |
| 7,845,823 | B2 | 12/2010 | Mueller et al. |
| 8,091,543 | B2 | 1/2012 | Baumann et al. |
| 8,426,777 | B2 | 4/2013 | Elston, III et al. |
| 8,766,144 | B2 | 7/2014 | McLoughlin et al. |
| 9,041,799 | B2 | 5/2015 | Bielstein |
| 9,069,340 | B2 | 6/2015 | Minvielle |
| 9,149,058 | B2 | 10/2015 | Bilet et al. |
| 9,414,444 | B2 | 8/2016 | Libman et al. |
| 9,460,633 | B2 | 10/2016 | Minvielle |
| 9,528,972 | B2 | 12/2016 | Minvielle |
| 9,564,064 | B2 | 2/2017 | Minvielle |
| 10,057,946 | B2 | 8/2018 | Mills et al. |
| 10,092,129 | B2 | 10/2018 | Jenkins et al. |
| 2003/0139843 | A1 | 7/2003 | Hu et al. |
| 2005/0046584 | A1 | 3/2005 | Breed |
| 2007/0001012 | A1 | 1/2007 | Kim et al. |
| 2007/0029306 | A1 | 2/2007 | Chun et al. |
| 2008/0029078 | A1 | 2/2008 | Baumann et al. |
| 2008/0120188 | A1 | 5/2008 | Mobley et al. |
| 2010/0006558 | A1 | 1/2010 | McLoughlin et al. |
| 2010/0134620 | A1 | 6/2010 | Bielstein |
| 2010/0145483 | A1 | 6/2010 | McGonagle et al. |
| 2010/0147823 | A1 | 6/2010 | Anderson et al. |
| 2011/0002677 | A1 | 1/2011 | Cochran et al. |
| 2011/0284518 | A1 | 11/2011 | Elston et al. |
| 2012/0038549 | A1 | 2/2012 | Mandella et al. |
| 2012/0170247 | A1 | 7/2012 | Do |
| 2013/0092682 | A1 | 4/2013 | Mills et al. |
| 2013/0171304 | A1 | 7/2013 | Huntley |
| 2013/0176116 | A1 * | 7/2013 | Jung ...................... G08C 17/02 340/12.5 |
| 2013/0269539 | A1 | 10/2013 | Polt |
| 2013/0277353 | A1 | 10/2013 | Joseph et al. |
| 2013/0306627 | A1 | 11/2013 | Libman et al. |
| 2014/0026762 | A1 | 1/2014 | Riefenstein |
| 2014/0199455 | A1 | 7/2014 | Bilet et al. |
| 2014/0203012 | A1 | 7/2014 | Corona et al. |
| 2014/0297467 | A1 * | 10/2014 | Soller ................ H04L 65/4084 705/26.8 |
| 2015/0056344 | A1 | 2/2015 | Luckhardt |
| 2015/0285513 | A1 | 10/2015 | Matarazzi et al. |
| 2015/0289324 | A1 | 10/2015 | Rober et al. |
| 2016/0278563 | A1 | 9/2016 | Choudhary |
| 2017/0074522 | A1 | 3/2017 | Cheng |
| 2017/0150842 | A1 | 6/2017 | Young et al. |
| 2018/0324908 | A1 | 11/2018 | Denker et al. |

FOREIGN PATENT DOCUMENTS

| | | |
|---|---|---|
| CN | 201353794 Y | 12/2009 |
| CN | 202392848 | 8/2012 |
| CN | 103234228 A | 8/2013 |
| CN | 103592227 | 2/2014 |
| CN | 103592227 A | 2/2014 |
| CN | 104042124 A | 9/2014 |
| CN | 203914599 | 11/2014 |
| DE | 19828333 A1 | 12/1999 |
| DE | 202008000135 | 3/2008 |
| DE | 102008043722 | 5/2010 |
| DE | 102012204229 | 9/2013 |
| EP | 0298858 A1 | 1/1989 |
| EP | 0298858 | 11/1990 |
| EP | 0899512 | 3/1999 |
| EP | 1179711 A1 | 2/2002 |
| EP | 1746350 A2 | 1/2007 |
| EP | 2149755 A1 | 2/2010 |
| EP | 2618634 A1 | 7/2013 |
| GB | 1163509 A | 9/1969 |
| JP | 11-63509 | 3/1999 |
| JP | 2005276171 | 10/2005 |
| JP | 2013-53794 | 3/2013 |
| WO | 2006128696 A1 | 12/2006 |
| WO | 2007022507 A2 | 2/2007 |
| WO | 2009012874 A2 | 1/2009 |
| WO | 086487 | 6/2014 |
| WO | 2014086486 A2 | 6/2014 |

OTHER PUBLICATIONS

Sun, Da-Wen; "Computer Vision Technology For Food Quality Evaluation", Second Edition, Academic Press, 2016.

Automated Fruit Recognition for Super Markets and Food Stores, Fraunhofer, http://www.iosb.fraunhofer.de/servlet/s/33328/, accessed online Nov. 13, 2014.

"European Search Report Application No. 16 790 106.5, dated Aug. 2, 2019.".

Chinese Office Action for Application No. 201680025497X dated Jan. 14, 2020.

Chinese Office Action for Application No. 201680025497X dated Apr. 27, 2020.

* cited by examiner

TAILORED FOOD PREPARATION WITH AN OVEN

CROSS-REFERENCE TO RELATED APPLICATIONS

This application is a continuation-in-part of U.S. application Ser. No. 15/450,546, filed 6 Mar. 2017, which is a continuation of U.S. application Ser. No. 15/147,597, filed 5 May 2016, which claims the benefit of U.S. Provisional Application No. 62/157,325 filed 5 May 2015, both of which are incorporated in their entirety by this reference. This application also claims the benefit of U.S. Provisional Application No. 62/517,520 filed 9 Jun. 2017, which is incorporated by its entirety by this reference.

TECHNICAL FIELD

This invention relates generally to the food preparation field, and more specifically to a new and useful approach for leveraging user feedback in operating an appliance.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
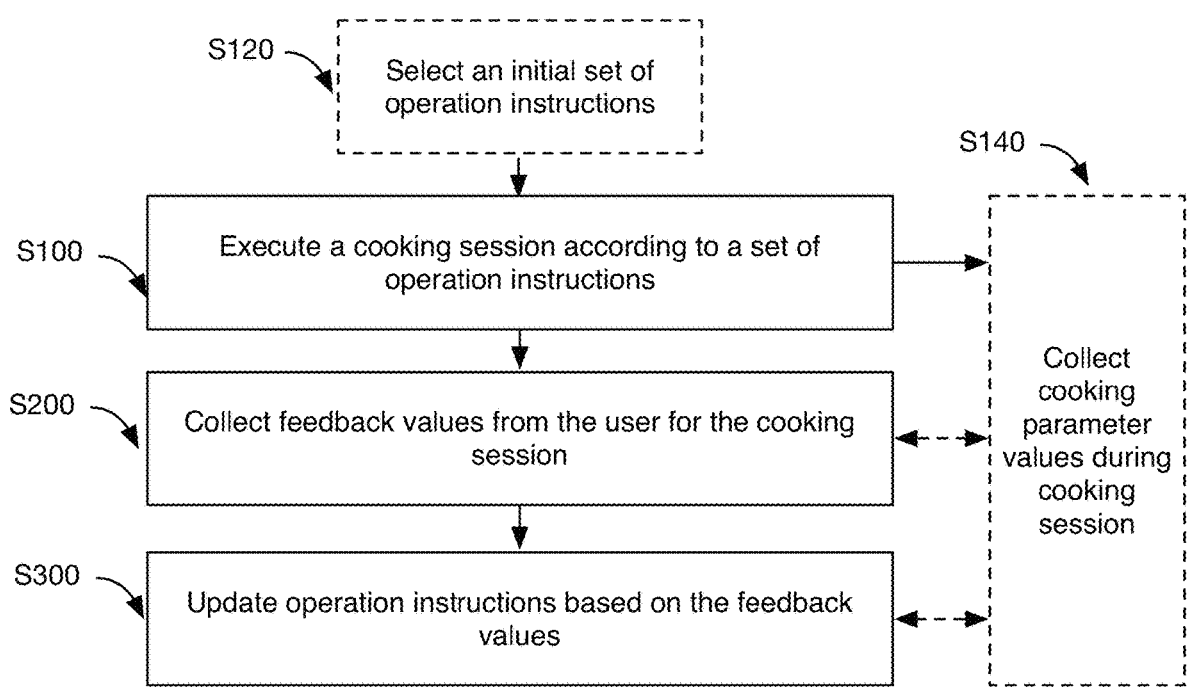
FIG. 1 is a flow chart of an embodiment of a method.

As shown in FIG. 1, an embodiment of a method for updating appliance operation based on user feedback from a user can include: executing a cooking session S100 according to a set of operation instructions; collecting feedback values S200 from the user for the cooking session; and updating the set of operation instructions S300 based on the feedback values. Executing the cooking session S100 can optionally include: selecting an initial set of operation instructions S120 and collecting cooking parameter values during the cooking session S140. The method can additionally or alternatively include: determining updated operation instructions for a subsequent cooking session, generating debugging alerts associated with hardware and software errors S400; dynamically controlling the appliance based on the collected cooking parameter values, and/or any other suitable operations associated with operating appliances based on feedback values, such as in a manner analogous to U.S. application Ser. No. 15/147,705 filed 5 May 2016 and Provisional App. No. 62/157,325 filed 5 May 2015, which are incorporated in its entirety by this reference.

Figure 2:
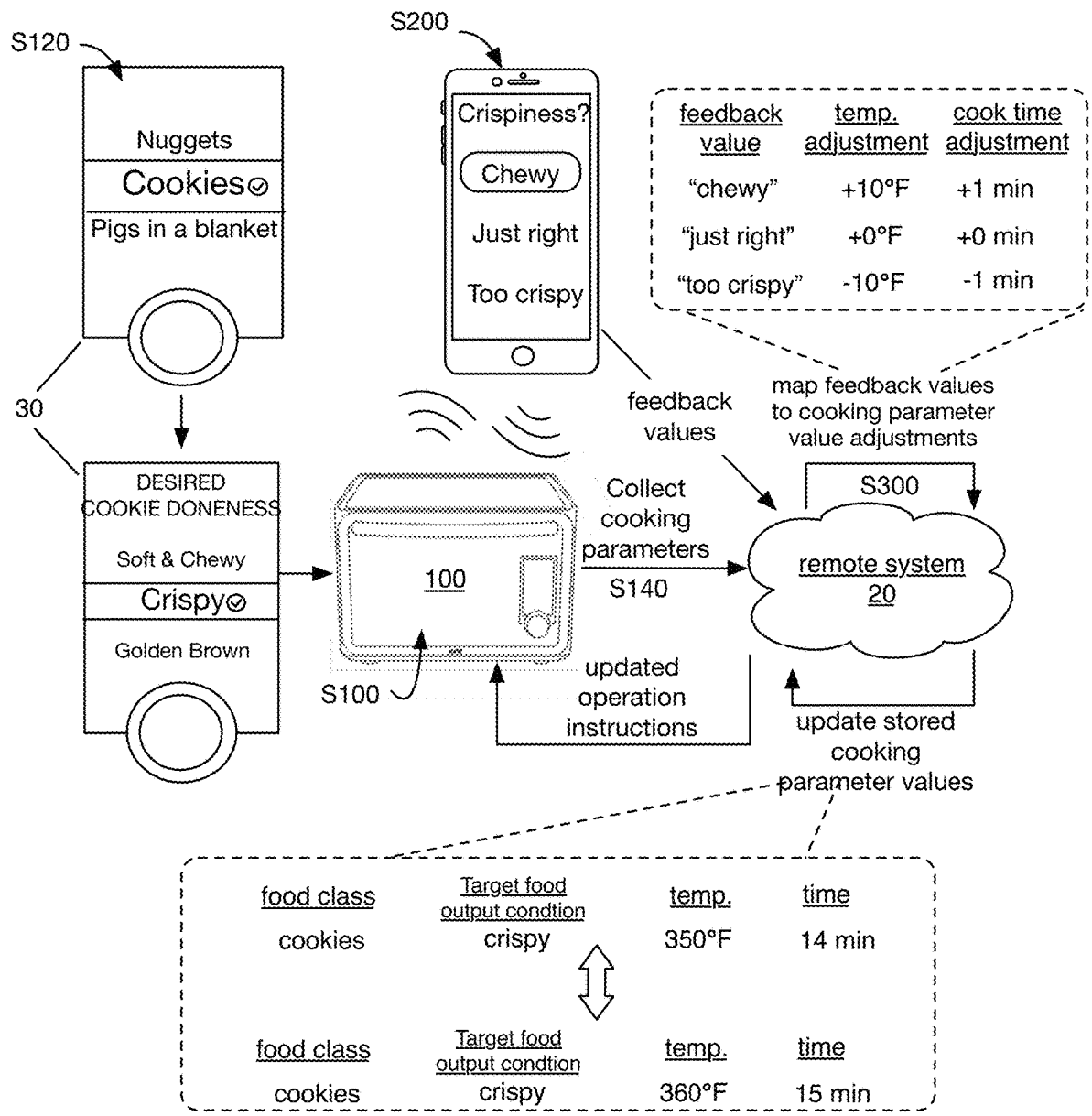
FIG. 2 is a schematic representation of a variation of an embodiment of a method.
Figure 4:
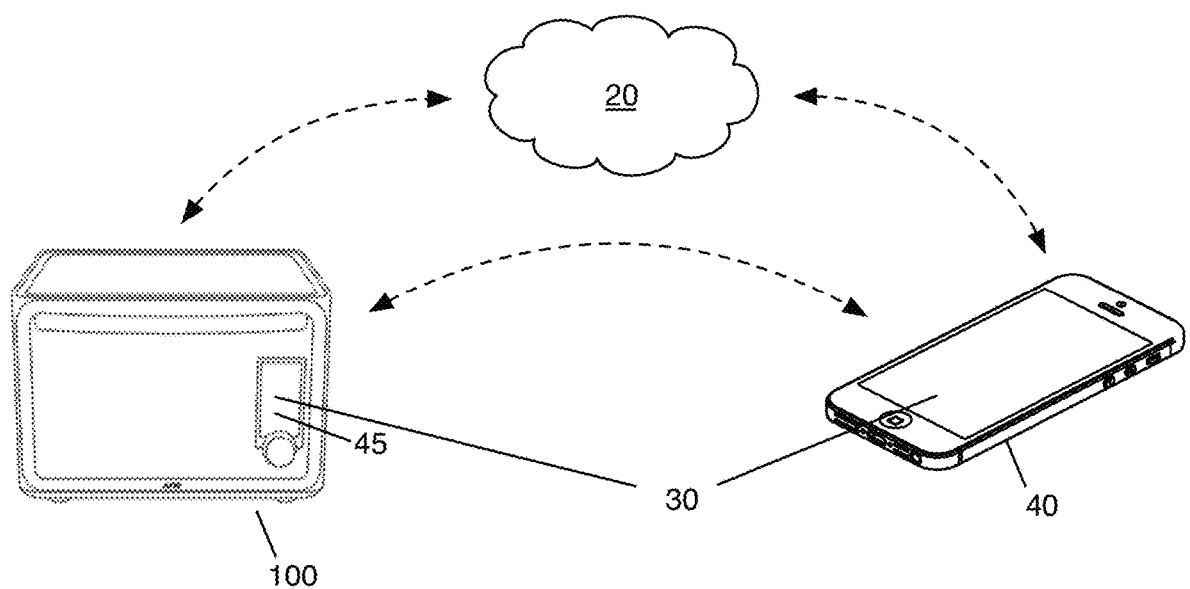
FIG. 4 is a schematic representation of an embodiment of a system.
Figure 5:
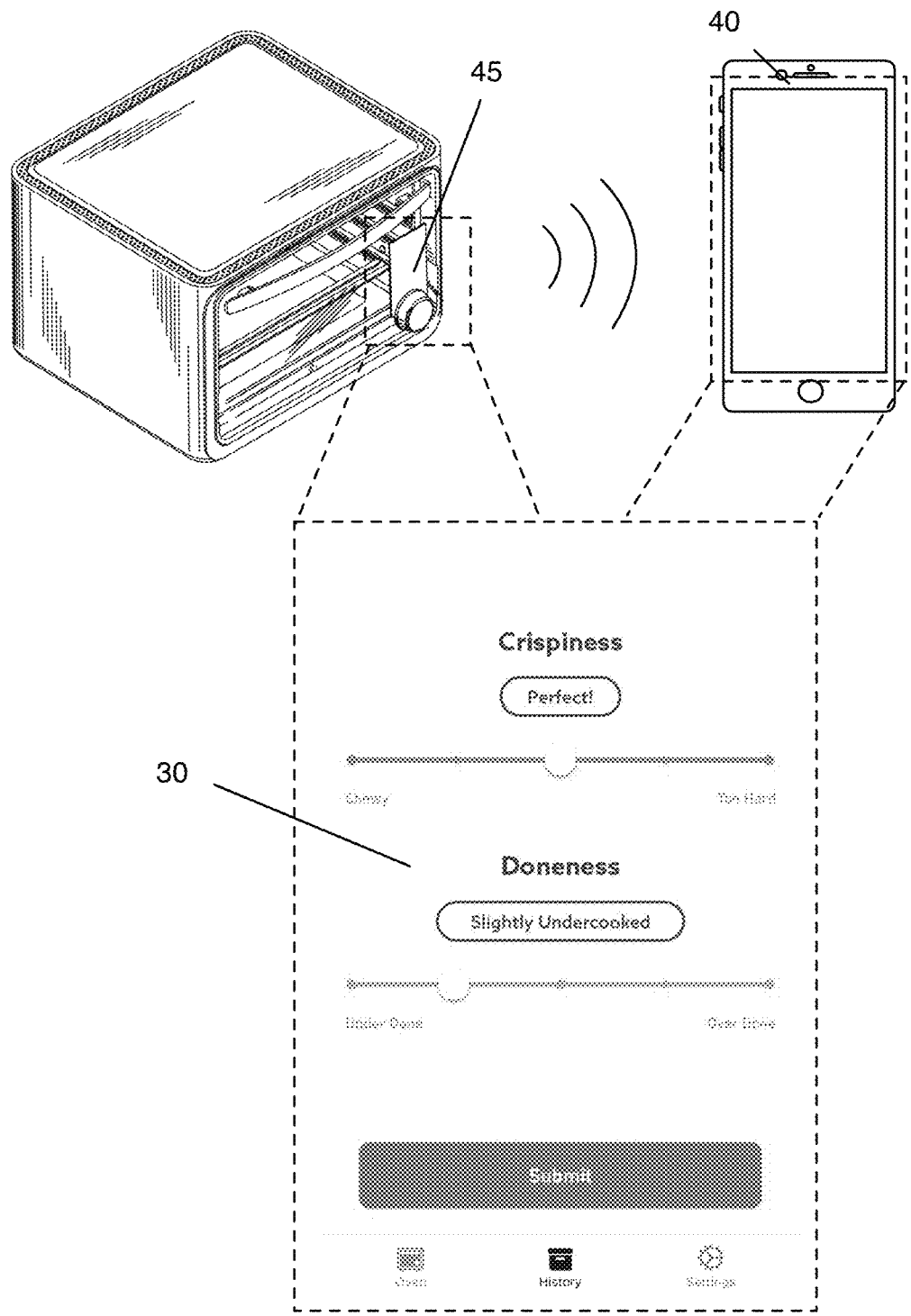
FIG. 5 is a schematic representation of a user interface in variations of embodiments of a system.

Portions of the method are preferably implemented by an appliance, more preferably a cooking apparatus, such as a connected oven, but alternatively any suitable appliance, and/or a user device (user interface), in communication with a computing system (e.g., as shown in FIG. 2, FIG. 4 and FIG. 5), but any portions of the method can be implemented by any suitable components, such as those described in U.S. application Ser. No. 15/147,705 filed 5 May 2016, which is incorporated in its entirety by this reference. All descriptions of the oven herein can be applied to any suitable appliance (e.g., grill, stovetop, hood, etc.). However, the cooking session can be performed using any other suitable connected oven or cooking apparatus (e.g., grill, stove, pan, etc.). All or a portion of the method can be performed by the computing system, oven (e.g., as disclosed above, alternatively a different oven), user device, and/or any other suitable computing system. All or a portion of the method can be performed in real- or near-real time, after a delay, concurrently (e.g., in parallel; concurrently on different threads for parallel computing to improve system processing ability for processing feedback values and generating updated operation instructions; etc.), asynchronously (e.g., sequentially), or with any other suitable temporal relationship. All or a portion of the method can be performed automatically, pseudo-manually (e.g., in response to receipt of a user input), in temporal response to a trigger event, or at any other suitable time. All or a portion of the method can be repeated, performed periodically, or performed at any other suitable frequency. Multiple method instances for different ovens, foodstuffs, or users can be performed in parallel, in series, or with any other suitable temporal relationship. However, the method can be otherwise performed by and/or using one or more instances of the systems, elements, and/or entities described herein.

In a specific example, as shown in FIG. 2, the method can include, for a particular cooking session: cooking a foodstuff in S100 according to a set of operation instructions (e.g., activating the heating elements proximal the oven back to 350° F. for 14 minutes) associated with a food class (e.g., "cookies") and additionally or alternatively, a target food output condition for the food class (e.g., "crispy" for "cookies") specified by the user prior to the cooking session in S120; collecting cooking parameter values sampled by oven sensors within the cooking cavity of the oven during the cooking session in S140; receiving feedback values for a subjective food parameter from the user for the cooked foodstuff (e.g., feedback value: "chewy" for subjective food parameter: "crispiness" level, etc.) in response to surveying the user after the cooking session in S200; updating the set of operation instructions based on the feedback values in S300 (e.g., mapping a "chewy" feedback value to an increase in the temperature oven parameter from 350° F. to 360° F. and an increase in the time oven parameter from 14 min to 15 min for the food class "cookies" and target food output condition "crispy"); and for a subsequent cooking session for the same food class and/or the same target food output condition for the food class, operating the cooking apparatus according to the updated set of cooking instructions (e.g., 410° F.). However, the method and/or system can be implemented in any other suitable way.

1.1 Benefits

The method and/or system can function to tailor cooking sessions to the preferences of a user or population thereof by transforming feedback values (e.g. provided by the user) into actionable adjustments to the operation of the oven. As such, the method and/or system can confer many benefits over conventional technologies:

First, the method can achieve a food output condition that is more aligned to a user's preferences, by collecting the user's subjective feedback and automatically determining requisite adjustments to tailor oven operation instructions. Conventionally, cooking results are oftentimes dependent on multiple operation parameters (e.g., time, temperature settings, humidity, heat direction or heating patterns, airflow, etc.), which are manually input by the user for each cooking session. This makes it difficult for an inexperienced user to know which operation parameter to use or adjust to consistently achieve a desired result (e.g., a target food output condition). The inventors discovered that gathering a user's subjective feedback (e.g. doneness, crispness, texture, moistness), and automatically associating the feedback with operation instructions used to achieve the food output, can be a more intuitive way for a user to instruct and operate a cooking appliance, as compared to direct user adjustment of cooking parameters to achieve a target food output condition, thus enabling a simple, improved way for a user to tailor cooking instructions (e.g., FIG. 2 and FIG. 3). However, the method can leverage subjective user feedback in any other suitable way to improve the operation and reliability of a cooking appliance to achieve a target food output condition.

Second, the method can generate a larger, more comprehensive, and more informative dataset to improve the accuracy of operation instruction adjustments, by collecting subjective feedback for a number of cooking sessions over time for a particular user, and/or across a user population. In an embodiment, user feedback can be collected after a cooking session has been completed, which allows assessment of how well a subjective food parameter of the cooked foodstuff (e.g., food output) met the target food output condition as defined by the user prior the cooking session. Such feedback associated with the food output condition of multiple, disparate cooking sessions allows generation of a historical dataset. Because user feedback can be collected and stored over time for multiple cooking sessions, the method can make more accurate adjustments to operation instructions than with conventional methods that use only a single feedback datapoint, and/or relate only to the current cooking session. In one example, the historical dataset can include feedback from multiple cooking sessions involving a particular food class, and/or feedback from multiple users involving a particular food class, and can be used in aggregate to instruct adjustments to cooking instructions (e.g., used to determine the direction or magnitude of parameter value adjustment, determine which parameter is adjusted, determine whether a parameter should be adjusted, etc.). However, the historical dataset can include any other suitable information from the cooking session that can be used to improve the accuracy of operation instruction adjustments.

Third, the method and/or system employs data management techniques and structures to collect, store, and process data from a plurality of cooking sessions, including respective operation instructions, which can improve ease of use and rapid analysis of data to tailor cooking sessions for a range of users and user preferences, and/or a range of food classes. The increasing prevalence of digital data collection can translate into a plethora of data collected by both the cooking apparatus and the user, giving rise to challenges of processing the vast array of data. However, the inventors have addressed such challenges by providing a full-stack technology improving upon collection, storage, and processing of different types of data. In one embodiment, the technology can aggregate such data into a cohesive database system (e.g., as part of a computing system for determining operation instructions), wherein operation instructions can be stored in association with a food class, a target food output condition for the food class, a user identifier, an oven identifier, a cooking session identifier, a set of cooking parameter values measured by the sensor system to be achieved by the set of cooking instructions, and/or any other suitable data, thereby enabling improvement of data storage and retrieval (e.g., through associating food class analysis modules with relevant identifiers to improve subsequent retrieval of and/or analysis with the modules; etc.). Furthermore, the technology can apply computer-implemented rules (e.g., feature engineering rules for processing subjective query responses into subjective parameter values correlated with operation instructions in order to improve accuracy of operation instructions adjustments; threshold rules defining threshold conditions determining the types of adjustments generated, presented, and/or otherwise processed; computer-implemented rules tailored to different user identifiers and/or user populations; etc.) in conferring improvements to computerized processing of operation instructions based on user feedback. In a specific example, the system can receive and interpret a user input (e.g., food class, target food output condition, image selection) during initiation of a cooking session, and process the user input to determine and transmit a set of operation instructions to the oven in near-real time. In another specific example, the system can receive and interpret a user input (e.g., feedback values from a subjective query response) to update the set of operation instructions (processing the user input using computer-implemented rules) to better achieve a subjective parameter value encompassed by the target food output condition indicated by the user. However, computationally determining cooking operation instructions according to a user preference can be achieved in any other suitable manner.

Figure 15:
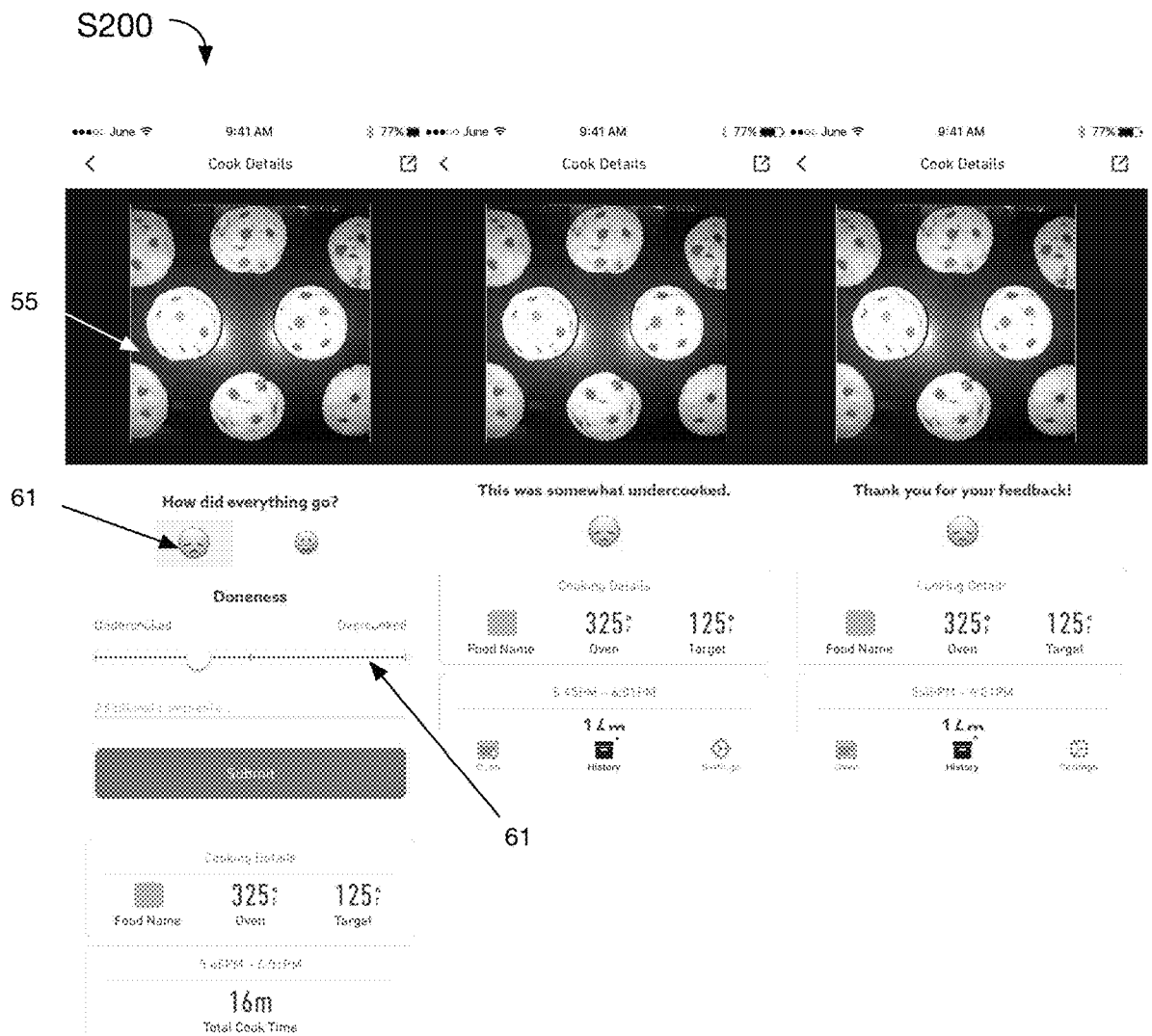
FIG. 15 depicts examples of sequential frames of a user interface for collecting feedback values in a variation of an embodiment of a method.

Fourth, the sensor system of the cooking apparatus can provide more contextual information regarding a cooking session to the user at a user interface. In developing a user interface, the inventors discovered that it can be easier for users to identify a previous cooking session using images of the foodstuff recorded during that cooking session, rather than using text-based identification methods (e.g., timestamp, alphanumeric identifier, food class descriptor(s), etc.). In an embodiment, a user interface can include a historical record of previous cooking sessions, organized and intelligently indexed (e.g., by food class, by date, etc.) wherein each cooking session is represented by a representative image of the foodstuff recorded during that cooking session, so that the user can provide feedback for a particular session/food class (FIG. 15). As such, the sensor system can be used to help the user distinguish amongst multiple cooking sessions associated with the same food class (e.g., multiple chicken cooking sessions) to provide accurate feedback, and/or when the system is unable to automatically recognize the foodstuff being cooked, and needs the user to label the session with a food class. However, the user interface can present any other additional information generated and/or collected by the system to improve the quality of user feedback.

Figure 23:
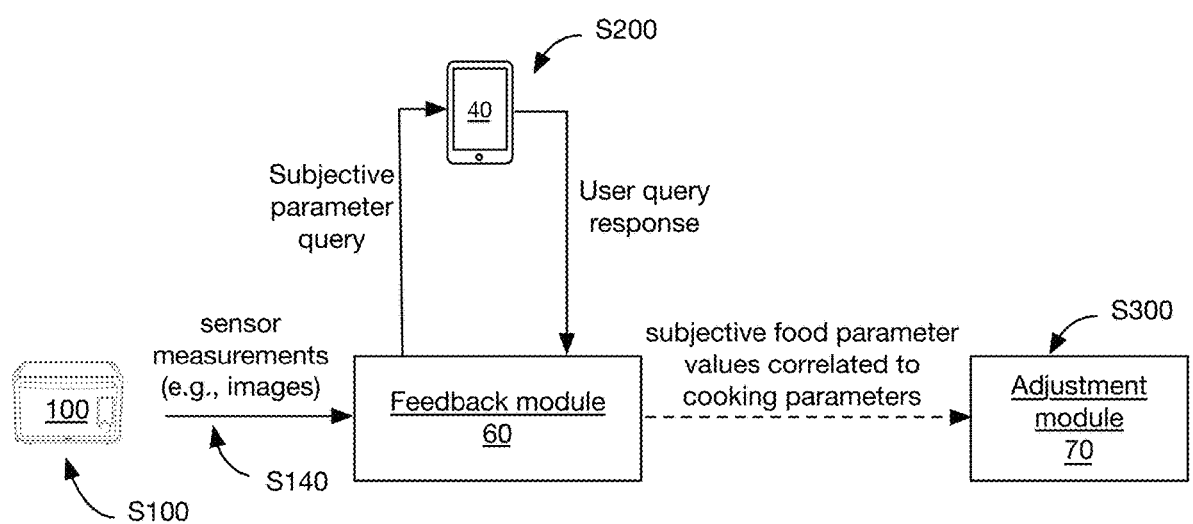
FIG. 23 is a schematic representation of a variation of an embodiment of a method.
Figure 24:
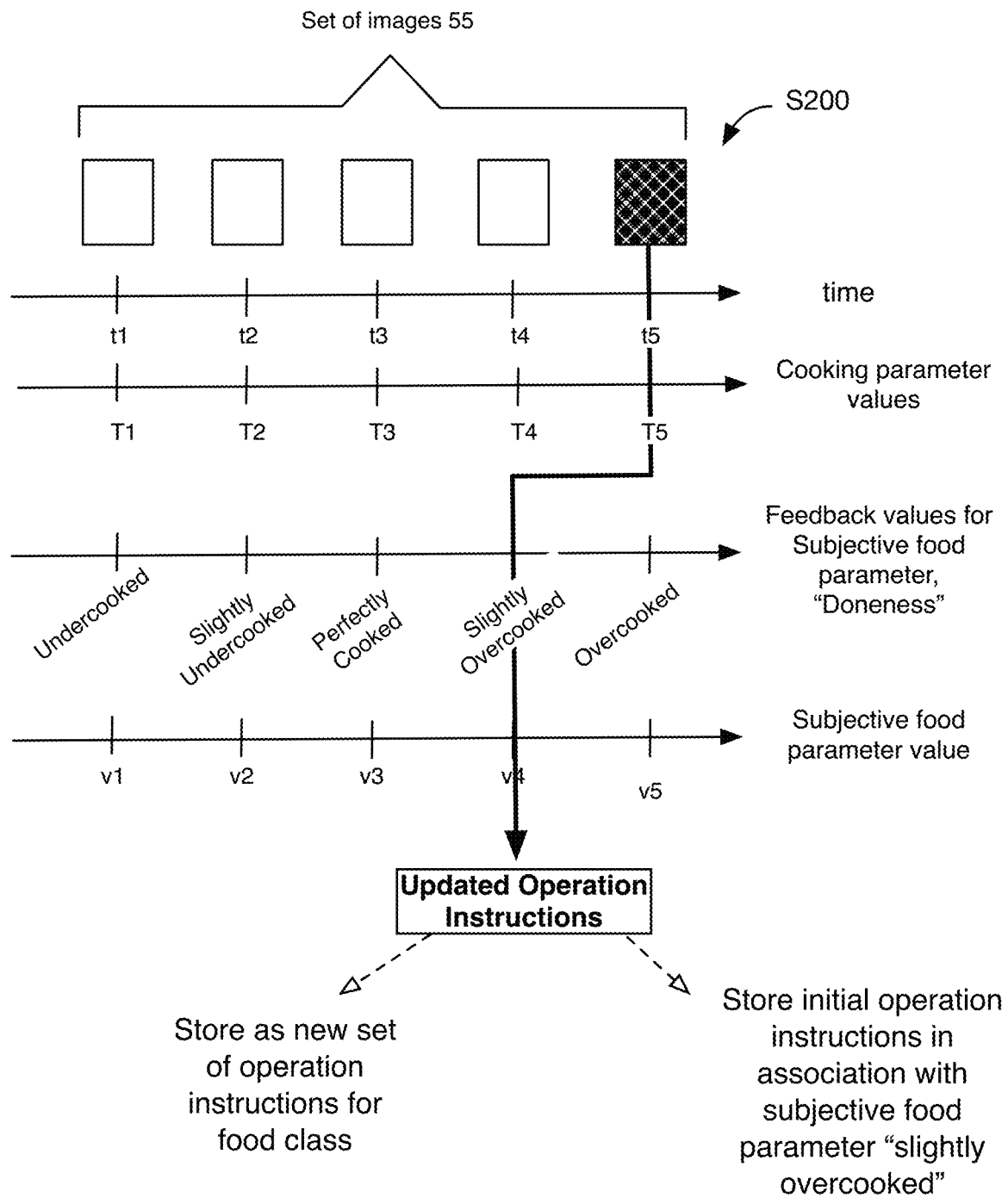
FIG. 24 is a schematic representation of mapping feedback values into operation instruction adjustments in a variation of an embodiment of a method.

Fifth, the sensor system of the cooking apparatus can provide more quantitative information describing a subjective parameter value indicated by the user to the computing system. In an embodiment as shown in FIG. 23 and FIG. 24, the sensor system of the oven (e.g., including a camera mounted within the oven cavity) can present the user (e.g., in a subjective feedback query) with timestamped images of the foodstuff that are associated with the cooking parameter values recorded during the cooking session (e.g., oven temperature and image sampled at a cooking session timestamp), wherein one or more images can be associated with a subjective parameter value 62 (e.g., based on feedback values 61 from a user query response processed with a feedback module 60). As such, the implementation of such images as a visual mechanism for soliciting subjective feedback, or any other suitable form of user input, can enable direct mapping of user-indicated subjective food parameters to the oven parameters being used at a given time during the cooking session. This can allow the system to distinguish associations between subjective preferences of a particular user and operation instructions performed by the cooking apparatus. However, the sensor system and the data collected from the sensor system can be used and/or processed in any other suitable way to improve the interpretation of user feedback by the computing system. In one example, the method can include adjusting an image parameter (e.g., saturation, hue, etc.) of the foodstuff in an image (e.g., a real image recorded during a historic cooking session, a synthetic image, etc.), wherein the image parameter adjustment is pre-associated with a known adjustment for a given cooking parameter (e.g., wherein hue adjustment is associated with cooking temperature adjustment). Furthermore, the sensor system can also assist in continuous monitoring of the foodstuff during a cooking session (e.g., FIG. 21), automated food recognition, image analysis of the foodstuff, and dynamic control of oven operation, all of which are described in U.S. application Ser. No. 15/147,705 filed 5 May 2016, which is incorporated in its entirety by this reference.

Sixth, the method and/or system can provide technical solutions necessarily rooted in computer technology (e.g., utilizing computational analysis modules for converting subjective food parameter values into operation instruction adjustments; dynamically updating operation instructions; data storage and retrieval for different types of user input; generating personalized content to users based on preferences; modifying perceptible digital elements associated with user data for optimized presentation of information at a lightweight and focused user interface; etc.) to overcome issues specifically arising with computer technology (e.g., fragmented data processing across disjointed collection approaches, storage approaches, analysis approaches, presentation approaches; etc.). In a specific example, the processor of the computing system can use historical user feedback and cooking session information to determine (e.g., estimate and propose) desirable operation instructions for a particular food class and user, through applying computer-implemented rules to selectively analyze specific user metrics and/or cooking parameter values. In another specific example, the method and/or system can additionally or alternatively function to identify and/or group users based on shared characteristics in order to facilitate determination and propagation of operation instructions suited to the users. However, the data collected and generated by the method and/or system can be implemented in any other suitable way.

Figure 21:
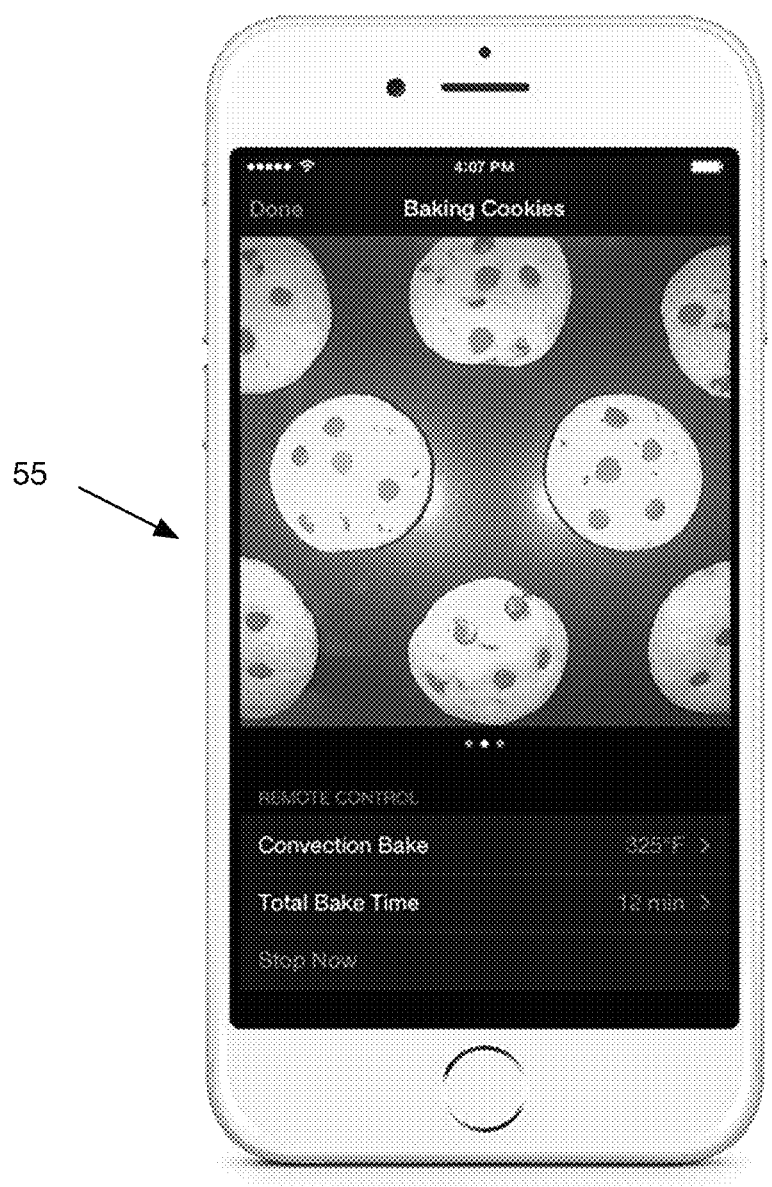
FIG. 21 depicts an example frame of a user interface for remote control of a cooking session in a variation of an embodiment of a method.

Seventh, by incorporating a wireless communication module, variants of the system can enable remote control of the cooking apparatus without physical or manual user input (e.g., starting or stopping cooking operation via a switch) to supply cooking instructions to the oven. In one example, information from the sensor system at the oven (e.g., a video of the cooking session, set of images 55) can be transmitted to a user interface at a remote user device during a cooking session, such that a user can monitor and control the progress of a cooking session in a location away from the oven (FIG. 21). In another example, the technology can leverage specialized computing devices (e.g., mobile devices with location sensors; inertial sensors; physical activity monitoring capabilities; digital communication behavior-monitoring capabilities; and/or other non-generalized functionality) in collecting supplemental data that can be used to provide additional context and/or insights associated with user inputs to the system. Furthermore, the wireless connectivity of the system can additionally enable information routing, remote controllability, or any other suitable communication between one or more user devices with one or more connected or unconnected cooking appliances that are in operation. In some examples, the system can allow wireless access to data by third party applications, download updates to software (e.g., updates to computational analysis modules), access crowd-sourced recipes from a central database (e.g., cloud), and send manufacturer reports (e.g., debugging reports for hardware/software). However, the method and/or system can include any other suitable functionality enabled by wireless communication.

2. System

As shown in FIG. 4, an embodiment of a system for improving oven operation based on user feedback can include: a cooking apparatus (e.g., a connected oven) 100 configured to cook and monitor a foodstuff 10 according to a set of cooking instructions (e.g., time, temperature settings), such as in S100, a user interface 30 (e.g., at a remote user device 40, at a user interface unit 45 onboard the oven 100) configured to collect user feedback (e.g., user responses to digitally presented queries surveying the user in relation to a cooked foodstuff), such as in S200, and a remote computing system 20 configured to determine adjustments to update a set of operation instructions used by the oven in a cooking session based on the user feedback, such as in S300. However, the system can be otherwise configured, and can additionally or alternatively include auxiliary devices and/or any other suitable components.

2.1 Connected Oven

Figure 6:
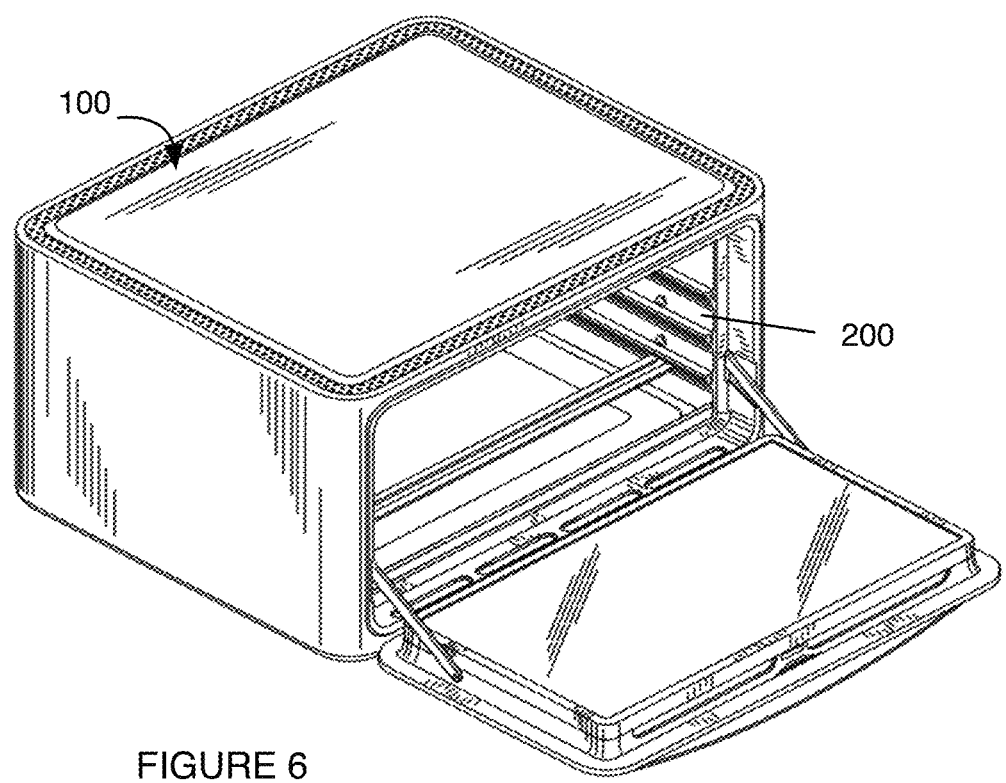
FIGS. 6-7 are schematic representations of a cooking apparatus in a variation of an embodiment of a system.
Figure 7:
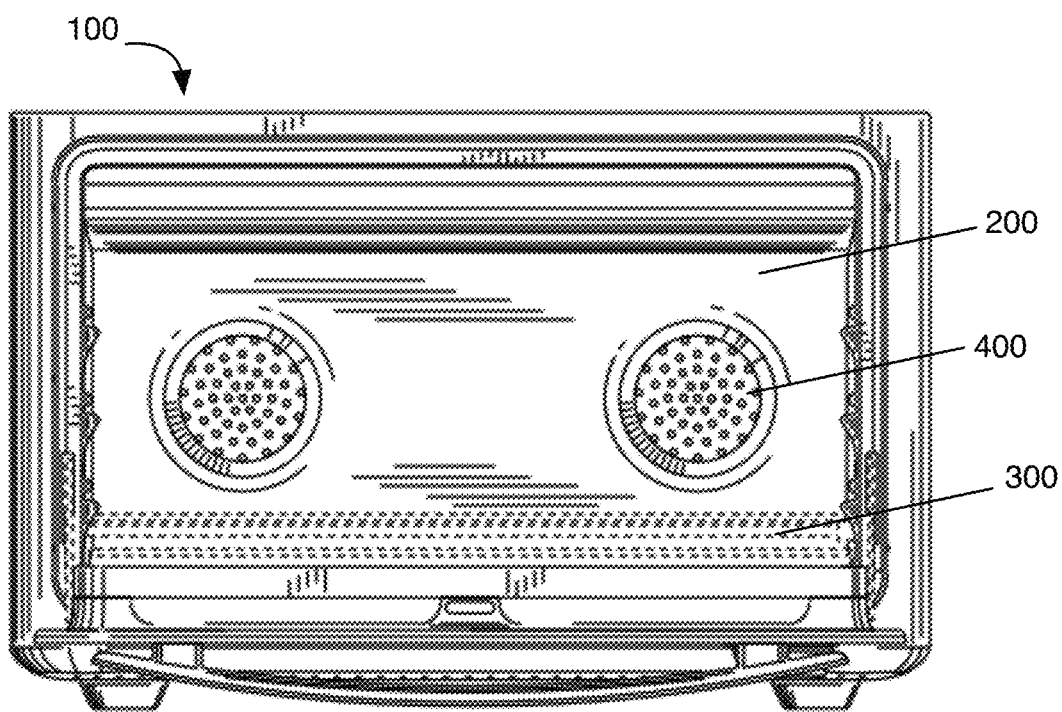
Figure 8:
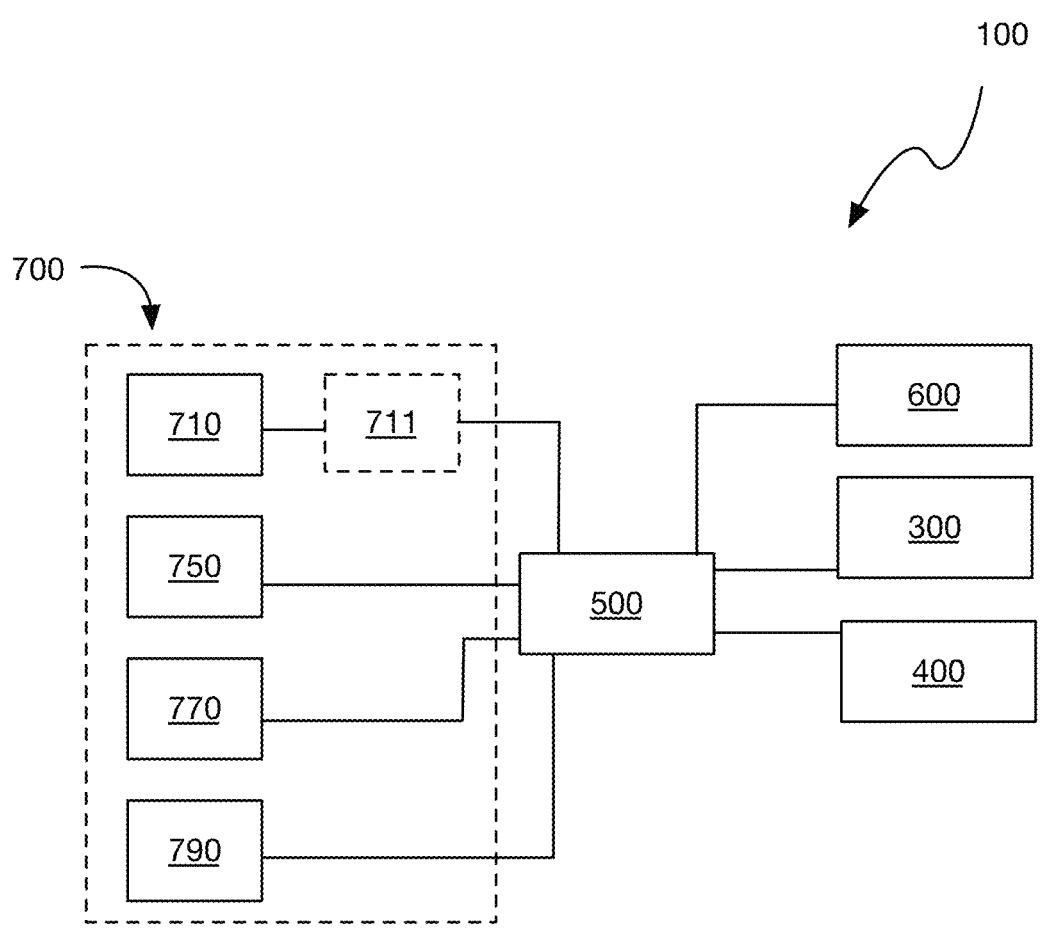
FIG. 8 is a schematic representation of subcomponents of a cooking apparatus in a variation of an embodiment of a system.

As shown in FIG. 6, FIG. 7 and FIG. 8, the connected oven 100 (e.g., the oven described in U.S. application Ser. No. 15/147,705 filed 5 May 2016 and incorporated in its entirety by this reference; any other suitable oven, etc.) can include a cooking lumen defining an oven cavity 200 (cooking chamber, cooking volume), a set of heating elements 300, a set of convection elements 400, a processing system 500, a communication system 600, and a sensor system 700. In an embodiment, the oven 100 functions to execute a cooking session (e.g., S100) for a foodstuff 10 based on a set of operation instructions received from a computing system 20, as well as collect and monitor cooking parameter values (e.g., in S140) using the sensor system 700. The oven 100 can additionally function to automatically adjust oven control parameters to achieve a target food parameter (e.g., in real- or near-real time), and is preferably in communication with a remote user device 30 and/or a remote computing system 20.

The oven 100 is preferably wirelessly connected to the remote computing system 20, user device 30, auxiliary system, or other endpoint, but can alternatively be connected to the endpoint via a wired connection. In one variation, the oven 100 can be wirelessly connected to the remote computing system 20 through a long-range connection (e.g., WiFi, cellular, LTE, etc.), wirelessly connected to a user device through a short-range connection (e.g., NFC, BLE, Bluetooth, etc.), and/or wirelessly connected to an auxiliary system through a mesh network. However, the oven 100 can be otherwise connected to any other suitable endpoint.

Figure 9:
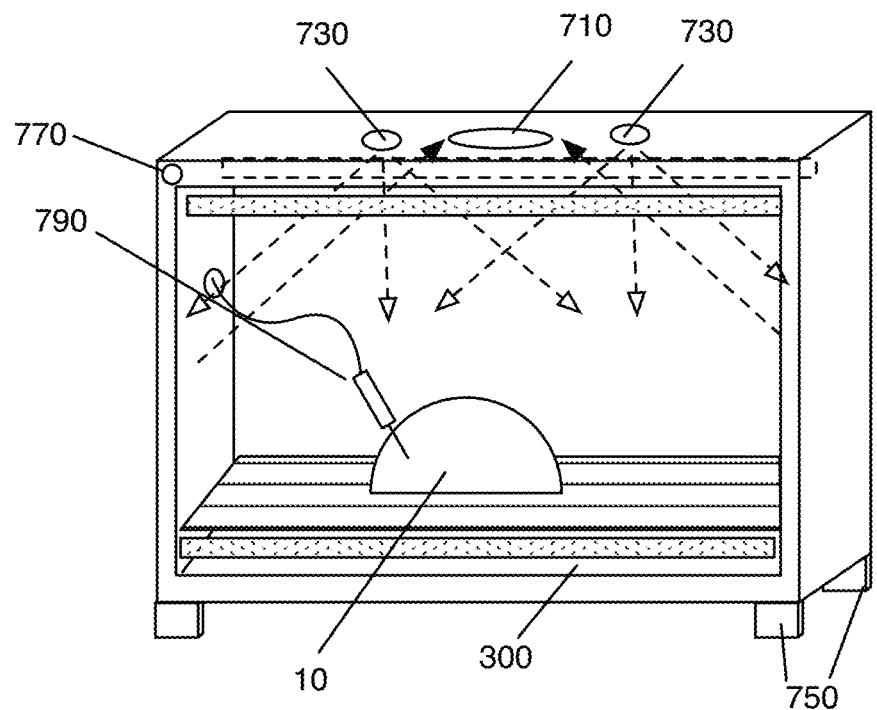
FIGS. 9-10 are schematic representations of subcomponents of a cooking apparatus in a variation of an embodiment of a system.
Figure 10:
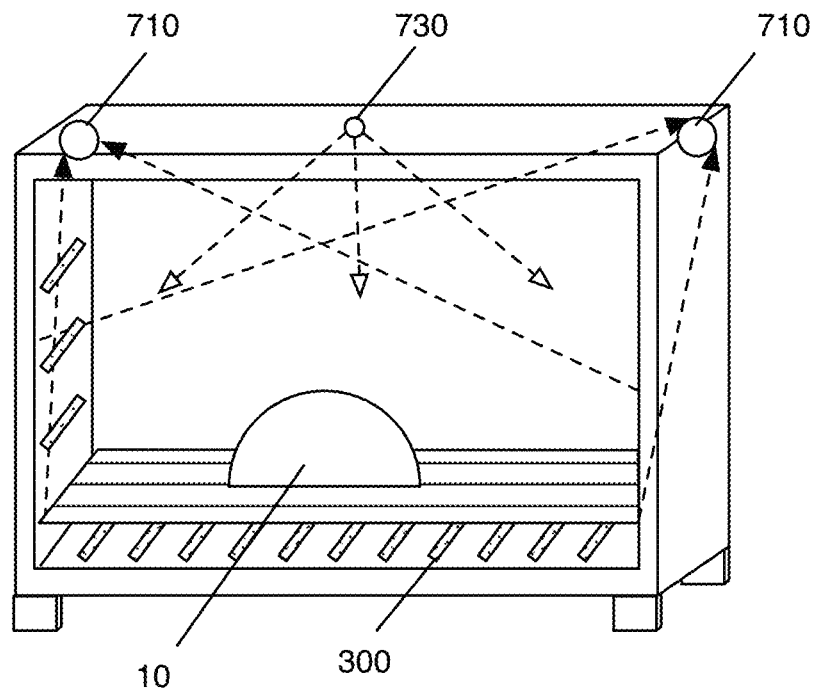

The sensor system 700 of the oven 100 functions to collect cooking parameter values 130 during execution of a cooking session 120 of a foodstuff (and/or before or after), which can be used to correlate user feedback with updated operation instructions. More specifically, the sensors can function to monitor oven parameters and/or foodstuff parameters as a function of time. As shown in FIG. 9 and FIG. 10, the sensor system 700 can include optical sensors 710 (e.g., image sensors, light sensors, etc.), audio sensors 770, temperature sensors 790, volatile compound sensors, weight sensors 750, humidity sensors, depth sensors, location sensors, inertial sensors (e.g., accelerators, gyroscope, magnetometer, etc.), impedance sensors (e.g., to measure bioimpedance of foodstuff), hygrometers, insertion temperature sensors (e.g., probes), cooking cavity 200 temperature sensors, timers, gas analyzers, pressure sensors, flow sensors, door sensors (e.g., a switch coupled to the door, etc.), power sensors (e.g., Hall effect sensors), or any other suitable sensor. The sensors of the sensor system can be directly or indirectly coupled to the cooking cavity 200. The sensors can be connected to and controlled by the processor 500, or be otherwise controlled. The sensors are preferably individually indexed and individually controlled, but can alternatively be controlled together with other like sensors.

In one variation, the sensor 700 can include an optical sensor 710 that functions to measure optical data about the cooking cavity 200 (e.g., foodstuff 10 within the cooking cavity 200). In a first embodiment, the sensor includes a camera configured to record images 11 or video of the cooking cavity 200 (e.g., food cooking within the cavity). The camera can be a CCD camera, stereocamera, hyperspectral camera, multispectral camera, video camera, wide angle camera (e.g., a fisheye camera with a fisheye lens, a rectilinear camera with a rectilinear lens, etc.) or any other suitable type of camera. In a specific example, the wide-angle camera can have an approximately 180-degree field of view (e.g., within 10 degrees or less). The camera can be cooled by the convection elements 400, cooled by a separate cooling system (e.g., a radiator and fan, watercooling, etc.), or remain uncooled. The camera can record images 11 using radiation emitted or reflected by the heating elements 300, by the foodstuff 10, by the oven walls, by an emitter, or by any other suitable radiation source. Alternatively or additionally, the camera can record images using ambient light or in conjunction with light emitters as described in variations of the sensor system in U.S. application Ser. No. 15/147,705 filed 5 May 2016 and incorporated in its entirety by this reference.

The camera can additionally include dedicated processing hardware 711 that pre-processes the captured image 11. The camera and/or any associated processing systems (e.g., chipsets) can be arranged along the top of the cavity (e.g., distal the heating elements 300, distal the feet, etc.), arranged along the side of the cavity, arranged along the bottom of the cavity, arranged in a corner of the cavity (e.g., upper right, upper left, etc.), arranged in the door of the cavity (e.g., supported by the inner door wall, supported by the outer door wall, be integrated into the user interaction unit, etc.), or be supported by any other suitable portion of the oven 100. Alternatively, the associated processing systems can be arranged separate from the camera (e.g., be part of the processing system, etc.). The camera lens is preferably flush with the cavity wall, but can alternatively be recessed or protrude from the cavity wall. The camera can be centered along the respective oven surface, offset from the oven surface center, or be arranged in any other suitable position. The camera can be statically mounted to the oven surface, movably mounted to the oven surface (e.g., rotate about a rotational axis, slide along a sliding axis, etc.), or be otherwise coupled to the oven 100. The oven 100 preferably includes one or more video cameras. The cameras can be substantially identical or be different. The cameras can be evenly distributed throughout the cavity (e.g., symmetrically distributed), or be unevenly distributed.

The camera can have a constant frame rate, variable frame rate, or any other suitable frame rate. In one variation, the frame rate can be dynamically adjusted to accommodate for the radiation from the foodstuff 10, ambient light, internally emitted light, or any other suitable light. The camera can be statically mounted to the oven 100, actuatably mounted to the oven 100 (e.g., rotate about an axis parallel to an oven 100 longitudinal axis, lateral axis, multi-direction, etc.), or otherwise mounted to the oven 100. The camera can dynamically apply one or more filters to single out a given set of light bands. The camera can dynamically apply one or more lenses to adjust the camera field of view or any other suitable optical parameter. The camera can additionally include a set of mirrors that selectively redirect radiation (e.g., light) or images to the foodstuff 10 and/or camera. The camera can have a static field of view, variable field of view, or other suitable field of view. The camera is preferably arranged with its field of view (FOV) directed at the cavity, but can alternatively be otherwise arranged. The FOV (single or combined) preferably substantially encompasses the entirety of the cavity, but can alternatively encompass a subset of the cavity or encompass any other suitable portion of the cavity. The FOV preferably encompasses at least the food tray or bottom of the cavity, but can additionally or alternatively encompass the front, back, walls, top, or any other suitable portion of the cavity. The camera is preferably sensitive to (e.g., measure in the spectral wavelength of) visual light, but can alternatively or additionally be sensitive to infrared light, ultraviolet light, or any other suitable electromagnetic wavelength.

Additional variations of the optical sensor 710 of sensor system 700 are further described in U.S. application Ser. No. 15/147,705 filed 5 May 2016 and incorporated in its entirety by this reference.

In another variation, the sensor system 700 can include one or more force sensors 750 (e.g., weight sensors). The force sensors 750 can function to measure the weight of the foodstuff 10 before, during, and after the cooking session. The force sensor measurements can additionally be used to determine the foodstuff weight change throughout the cooking session, which can be used to determine the cooking stage of the foodstuff 10. The force sensors 750 can be arranged in the tray supports (e.g., grooves supporting the food tray), rack supports (e.g., grooves supporting the food rack), in the rack or tray itself, in the oven feet (e.g., the oven 100 standoff from the support surface, mounted to the oven base along a surface opposing the cooking cavity 200, etc.), between the oven feet and the oven base, along the oven top, or in any other suitable location. In a specific example, the oven 100 includes a single weight sensor arranged in a single foot. In a second specific example as shown in FIG. 9, the oven 100 includes a weight sensor arranged in each foot (e.g., wherein the oven 100 can include four feet). In the second specific example, the oven 100 can additionally automatically determine the foodstuff mass distribution within the cooking cavity 200 based on the measured weight distribution across the feet.

In a third variation, the sensor can include one or more acoustic sensors 770 that records sounds within the cavity. More preferably, the acoustic sensor 770 records sounds of the food cooking. The sound record can be analyzed (at the oven 100 or remotely) to categorize the foodstuff 10, determine the cooking stage, or determine any other suitable foodstuff parameter. The sound sensor can be a microphone, transducer, ultrasound receiver, or be any other suitable sensor. The sound sensor can additionally include an emitter (e.g., speaker) configured to emit sounds of a predetermined frequency (e.g., ultrasound, alerts, etc.) and amplitude. In one variation, a first sound sensor can be arranged next to the convection elements 400 and a second sound sensor can be arranged distal the convection elements 400, wherein measurements from the first sound sensor can be used to cancel fan noise from the measurements of the second sound sensor. In a second variation, the system can include an external speaker voice commands, internal speakers (e.g., used to acoustically determine foodstuff parameters based on acoustic features, such as sizzling, or pop). However, the sound sensor can be otherwise arranged and/or used.

As part of the sensor system, the oven 100 can include one or more emitters 730 that functions to emit signals that the sensors can measure. For example, the emitter 730 can be a light emitter, wherein the camera records optical or visual images using light or other electromagnetic radiation emitted by the light emitter. In a second example, the emitter can be an acoustic emitter, wherein the acoustic sensor records acoustic images using acoustic waves emitted by the acoustic emitter. However, the emitter can emit any other suitable signal. The oven 100 can include one or more emitters of same or different type. Multiple emitters can be individually indexed and individually controlled, controlled together, or otherwise controlled by the processing system 500. Multiple emitters can be arranged in an array or in any other suitable configuration. Multiple emitters can be substantially evenly distributed within the cavity (e.g., along a cavity axis, about the optical sensor 710, etc.), or be unevenly distributed. The emitter(s) are preferably mounted to the cooking lumen (e.g., interior walls), but can alternatively be mounted to the oven 100 exterior, to an exterior arm aimed at the cooking cavity 200, or be otherwise arranged.

The sensor system of the oven can include any other suitable arrangement, type, and numerosity of sensors, as further described in U.S. application Ser. No. 15/147,705 filed 5 May 2016 and incorporated in its entirety by this reference.

2.2 User Interface

The user interface 30 functions to enable the user to interact with and monitor a cooking session at the oven, as well as provide user input (e.g., user instructions, user feedback) to the computing system 20 and/or the oven 100.

Figure 11:
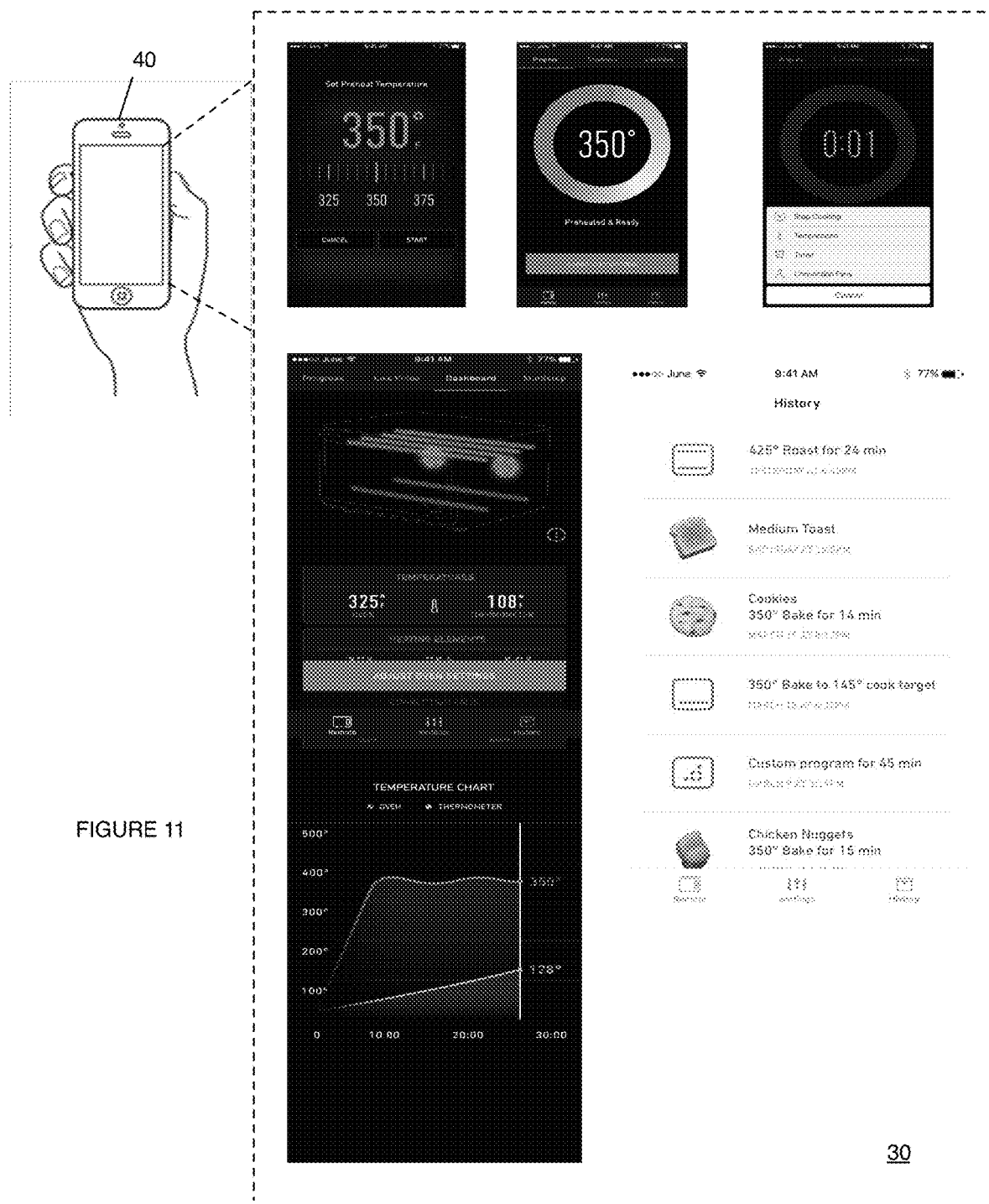
FIG. 11 depicts example frames of a user interface in a variation of an embodiment of a method.

The user interface is preferably presented at a remote user device 40 (e.g., FIG. 11). The user device 40 can be a mobile device (e.g., a laptop, tablet, phone, smartwatch, etc.), substantially static device (e.g., desktop, television), or be any other suitable device. The user device can include user output (e.g., display, speakers, etc.), user input (e.g., touchscreen, microphone, etc.), communication module (e.g., wireless communication module), or any other suitable component. The user device 40 can be associated with a user identifier, user account, or any other suitable identifier for the user device itself or the user associated with the user device 40. The user device 40 can be indirectly connected to the oven 100 (e.g., through the remote computing system), directly connected to the oven 100 (e.g., through BLE, NFC, WiFi, etc.), or be otherwise connected to the oven 100. The user device 40 can communicate with the oven 100 and/or the computing system 20 through an application executed by the user device, such as a native application, browser application, part of the operating system, or any other suitable application. The application can have access to user device information (e.g., location, proximity, user account information, user device identifiers, calendars, social networking systems, etc.), beacon information, or any other suitable information.

Figure 12:
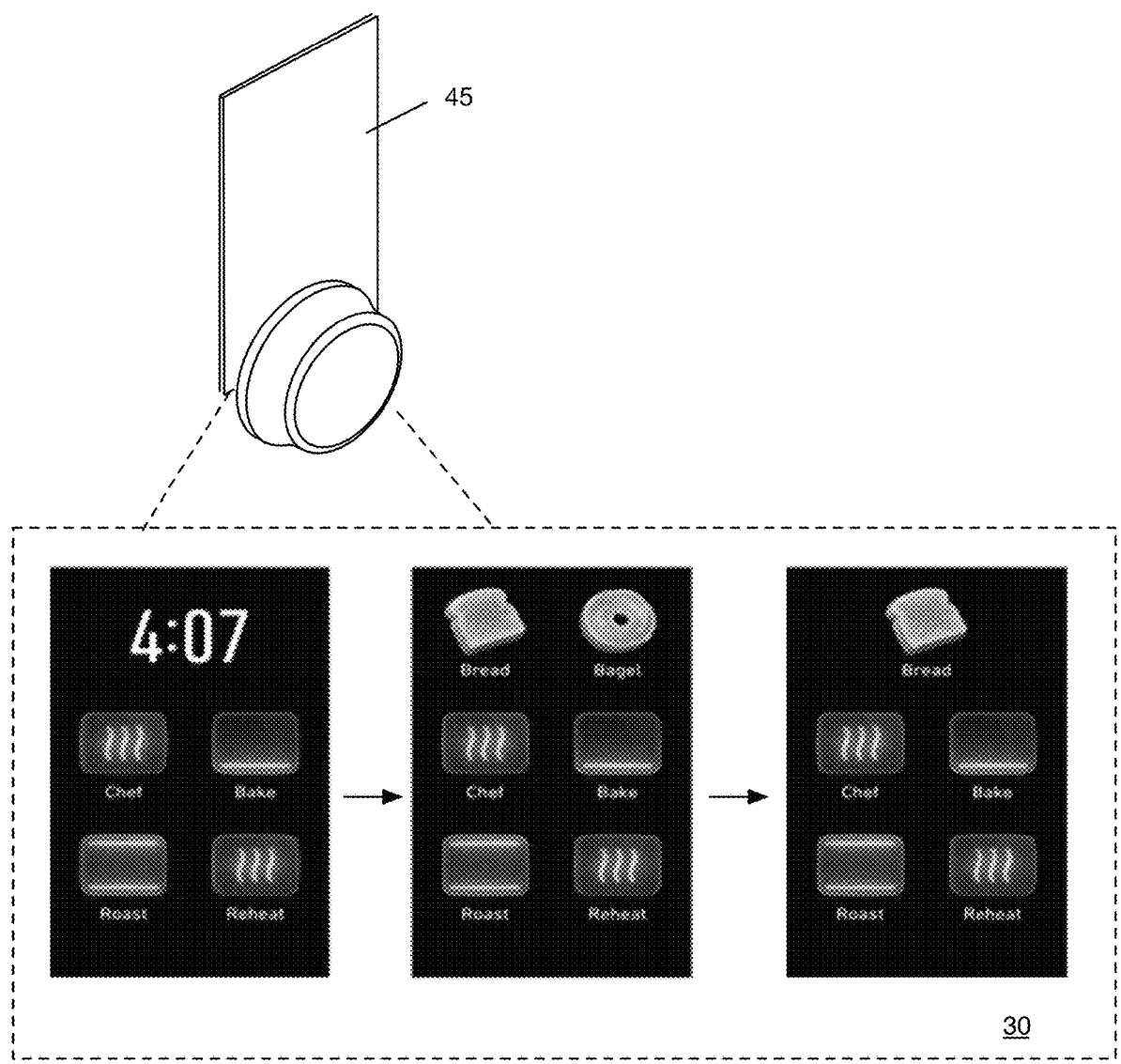
FIG. 12 depicts example frames of a user interface in a variation of an embodiment of a method.

Additionally, and/or alternatively, the user interface 30 can be presented at a user interface unit 45 located at the connected oven 100 (e.g., a digital touchscreen at the oven body), as described in U.S. application Ser. No. 15/147,705 filed 5 May 2016 and incorporated in its entirety by this reference (e.g., FIG. 5 and FIG. 12). However, the user interface 30 can be configured in any other suitable way in order to present information to and collect information from the user.

In a first variation, as shown in FIG. 21, the user interface 30 can be used to present the user with a live video feed of the foodstuff during a cooking session, recorded from the various sensors of the sensor system. The user interface 30 can optionally include features with which the user can make adjustments to the current cooking session (e.g., starting, pausing, stopping cooking steps, changing temperature or other operation settings), based on the transmitted data. However, the user interface 30 can be used to present any suitable arrangement, query, representation, and/or sequence of data collected by the oven 100 and/or computing system 20.

In a second variation, the user, via the user interface 30, can receive and respond to notifications from the oven 100 and/or the computing system 20 (e.g., notification of time remaining in a cooking session, an error or safety alert, etc.). The notification can be a cooking session completion notification (e.g., "ready to eat!"), an error notification, an instruction notification, or be any other suitable notification. In a variation, the cooking session completion notification is generated in response to a target cooking parameter value being met. In one example, the notification is generated when a target cooking time is met. In a second example, the notification is generated when a target food parameter value, such as a target internal temperature, surface browning, or internal water content, is met. However, any other suitable notification can be generated in response to the occurrence of any other suitable event.

Figure 20:
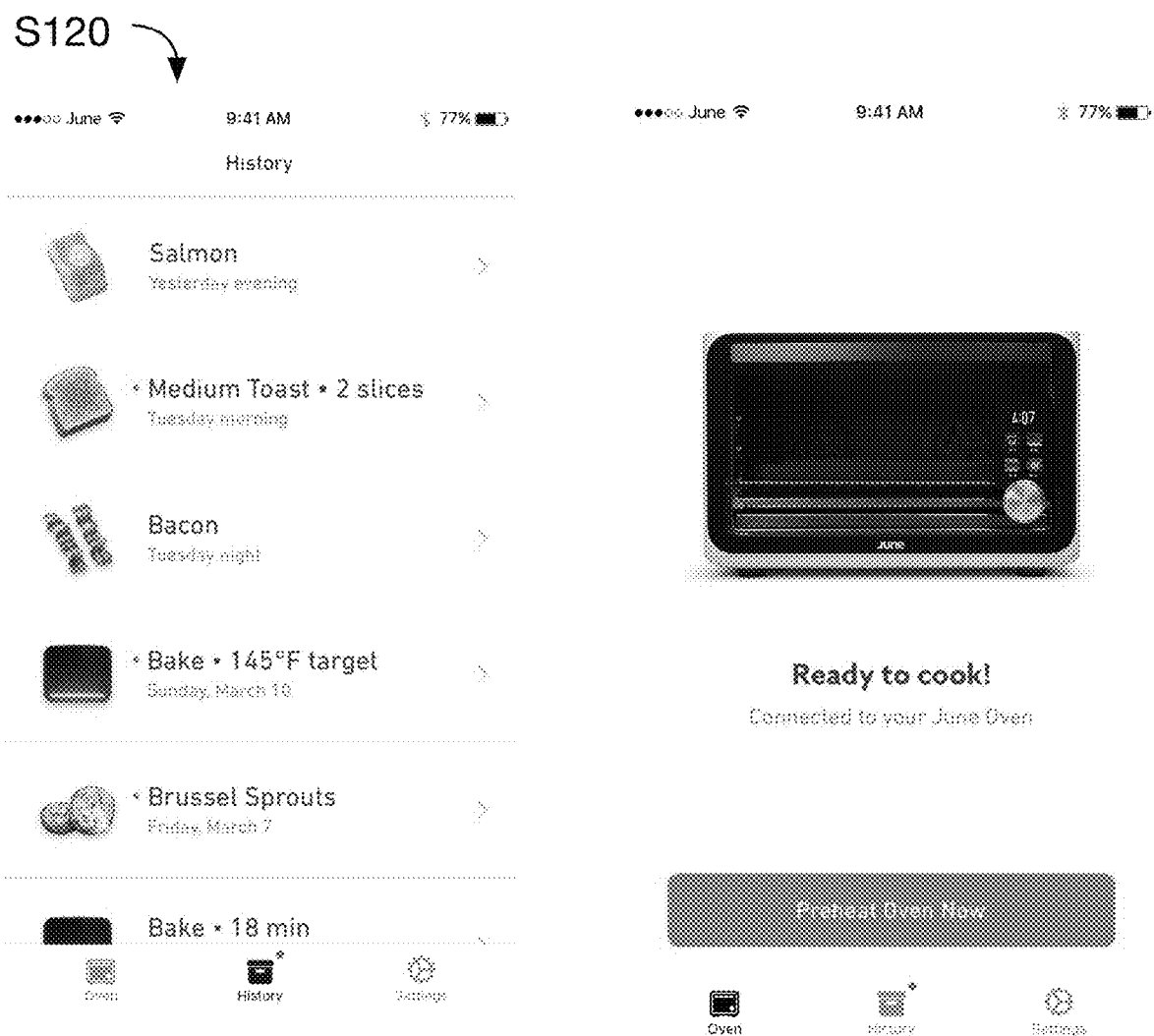
FIG. 20 depicts example frames of a user interface for user selection of operation instructions according to previous cooking sessions in a variation of an embodiment of a method.

In a third variation, as shown in FIG. 20, the user interface 30 can present a directory including information from historical cooking sessions, such as images of foodstuffs recorded during respective cooking sessions, from which the user can review information pertaining to each cooking session, provide feedback for the cooking session via subjective queries, and/or share portions of cooking session information with other users or a third party application. However, the user interface 30 can be configured in any suitable manner that presents the user with timely information regarding a cooking session, allows the user to review cooking session history, and/or allows the user to provide input/feedback to the oven and/or the computing system.

2.3 Computing System

As shown in FIG. 4, the system preferably includes a remote computing system 20 (computing system) that functions to collect, store, and process information from both the oven 100 and the user interface 30. The computing system 20 can be a server system, mobile device, desktop, tablet, laptop, or any other suitable remote system. The servers can be stateless, stateful, or have any other suitable configuration or property. Additionally and/or alternatively, portions of the computing system can be located at the oven 100 and/or the user device 40, as part of the processing system 500 of the oven described in U.S. application Ser. No. 15/147,705 filed 5 May 2016 and incorporated in its entirety by this reference.

Figure 22:
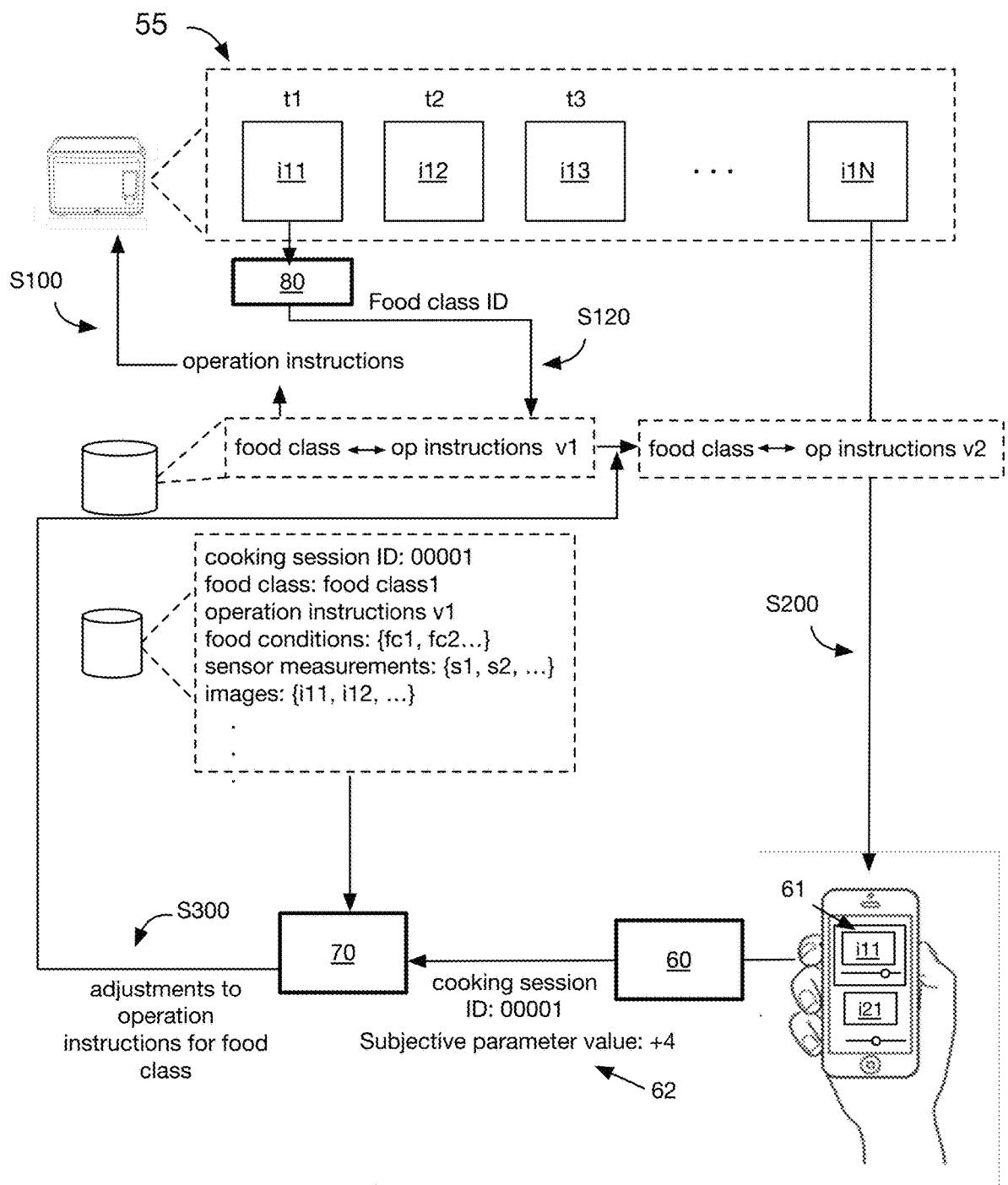
FIG. 22 is a schematic representation of variations of an embodiment of a method.

The computing system 20 preferably includes at least a processing system and a database. The processing system can include one or more processors, wherein the processor can be a PCB, CPU, GPU, or any other suitable processing or computing system, and functions to perform data processing tasks, such as: user feedback processing (e.g., via a feedback module 60), image analysis (e.g., via an image analysis module 80, including one or more segmentation modules, identification modules, pixel-to-physical area maps, etc.) and estimation/modeling of cooking instruction adjustments (e.g., via an adjustment model 70, time-to-finish estimation modules, etc.), as shown in FIG. 22. The processing system can additionally or alternatively function to automatically determine a classification for foodstuff 10 within the cooking cavity 200 (e.g., based on foodstuff 10 features extracted from sensor measurements), automatically determine oven component operation based on the classification, or perform any other suitable functionality as described in U.S. application Ser. No. 15/147,705 filed 5 May 2016 and incorporated in its entirety by this reference. The processor can also function to control communication between the computing system, the oven, and the user device, and/or an auxiliary connected system, such as a temperature control system, lighting system, door lock, connected microwave or other appliance.

The database functions to store data and information related to cooking sessions, including: cooking session identifiers, oven identifiers, user identifiers, user feedback, food class, operation instructions (i.e., cooking presets, recipes, cooking instructions), and sensor data (oven parameters, food parameters), which are further described below. The data stored can be static, updated by the processing system, or otherwise changed at any other suitable frequency.

2.3.1 Cooking Session Identifiers

Cooking session identifiers function as a reference label used by the system for all data collected during a particular cooking session (e.g., each cooking session has a unique cooking session identifier).

The cooking session identifier can be automatically generated, but can alternatively be manually generated. In a first variation, the cooking session identifier is randomly generated (e.g., as a randomized sequence of alphanumeric characters). In another variation, the cooking session identifier is generated by sequential increment (e.g., a consecutive, increasing number). However, the oven identifier assigned to a particular oven can be generated by any other suitable method.

The cooking session identifier can be defined, associated with, and/or accessed by additional information from the operation parameters recorded for the cooking session (e.g., cooking session date, cooking session start/end times, cooking duration, food class, cooking parameter values, user identifier associated with the cooking session, geographic location, etc.).

In another aspect, the cooking session identifier can be presented to the user at the user interface using an image recorded in association with the cooking session (e.g., recorded during the cooking session, after the cooking session, after the dish has been plated by the user, assigned by the user). However, the cooking session identifiers can be presented to a user in any other suitable way.

2.3.2 Oven Identifiers

Oven identifiers function as a reference label used by the system to identify and/or communicate with a particular oven unit, as well as to identify data (e.g., cooking parameter values recorded from the sensors, etc.) received from a particular oven unit (e.g., each oven has a unique oven identifier).

The oven identifier can be automatically generated, but can alternatively be manually generated. In a first variation, the oven identifier is generated based on the oven serial number assigned by the manufacturer. In another variation, the oven identifier is randomly generated (e.g., as a randomized sequence of alphanumeric characters). In a third variation, the oven identifier is manually input by the user (e.g., given a custom name). However, the oven identifier assigned to a particular oven can be generated by any other suitable method.

2.3.3 User Identifiers

User identifiers function as a reference label used by the system to identify and/or communicate with a particular user, as well as to identify data (e.g., user demographic information, preferences, feedback, cooking session history) that is associated with a particular user. User identifiers can facilitate retrieval of set of operation instructions preferred by the user, differentiation between multiple users of a single oven, accurate associations between received feedback values and the user providing the feedback values, and/or other suitable purposes.

The user identifier can be automatically assigned to a user based on the user device used by a particular user (e.g., received from a short-range wireless connection with the user device, such as an NFC or Bluetooth connection), based on a user account associated with a particular user, biometrics, randomly generated, or by any other suitable method. The user identifier can additionally or alternatively be generated in association with an oven identifier used to identify the oven primarily used by a particular user, cooking session information, or in association with any other suitable indicator.

Figure 13:
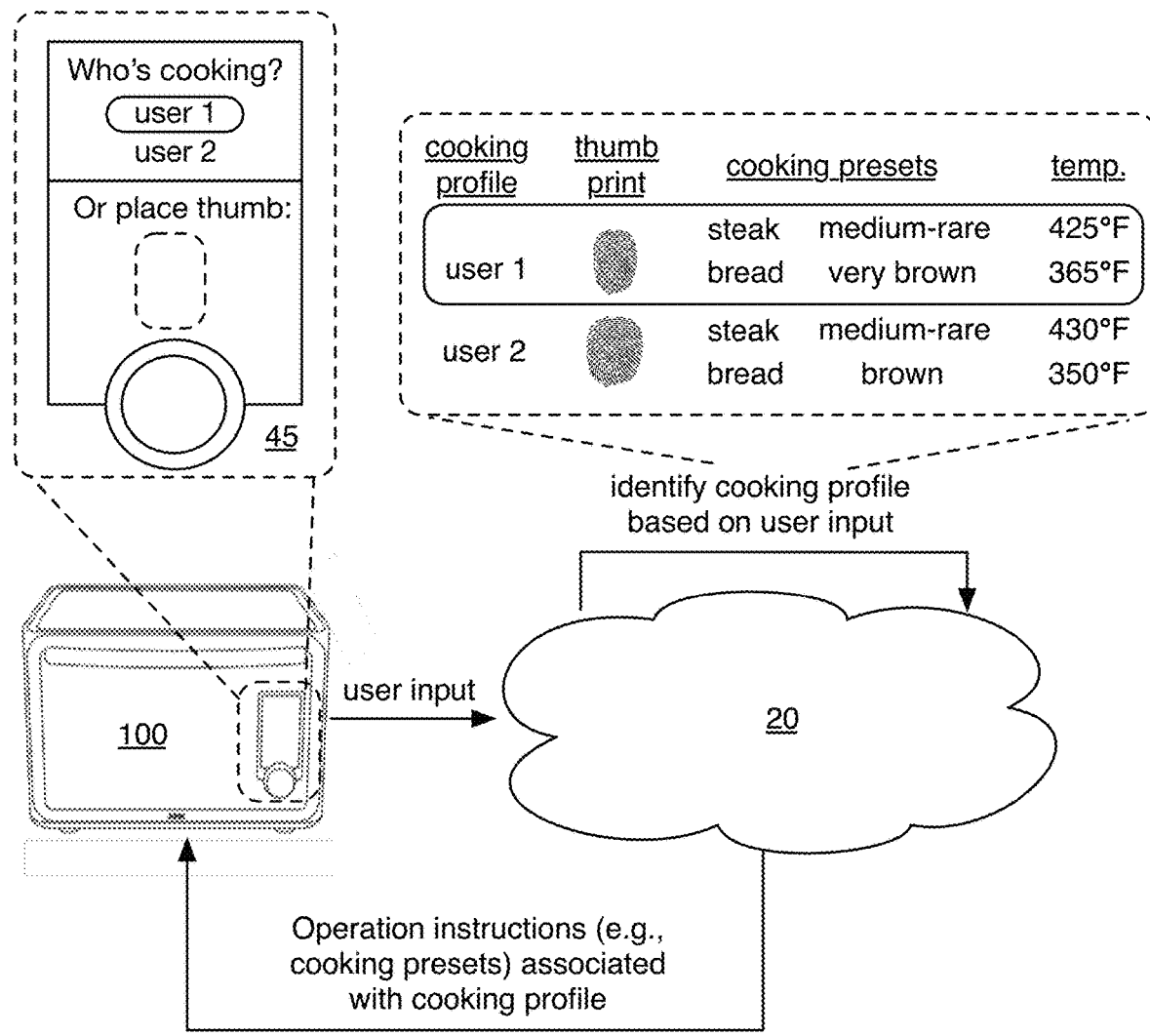
FIG. 13 is a schematic representation of user identification in a variation of an embodiment of a method.

In a first variation, identifying users can be based on user device parameters (e.g., identifying user device parameters for the user device transmitting feedback values, communicating with the oven, and/or otherwise interacting with system components; and identifying a user based on a match between the user device parameters and stored user device parameters in a cooking profile; etc.). In a second variation, identifying users can be based on biometric sensory data. In a first example, identifying users can include: storing images of the users in the cooking profiles; capturing an image of the current user with an optical sensor, such as an oven camera; and performing facial recognition based on comparisons between the stored images and the image of the current user. In a second example, as shown in FIG. 13, identifying users can be based on biometric sensor data (e.g., thumbprint data sampled at the user interface of the oven and compared to stored thumbprint data in cooking profiles, etc.). In a third variation, identifying users can be based on completed cooking sessions. For example, the method can include: storing first historic operation parameters associated with a first user, such as a high frequency of cooking sessions with a "salmon" food class; storing second historic operation parameters associated with a second user; receiving operation parameters for a current cooking session; and identifying the user corresponding to the current cooking session based on similarity scores between the current operation parameters and the historic operation parameters for the first and second users (e.g., identifying the first user based on a "salmon" food class for the current cooking session). Additionally or alternatively, identifying users can be performed in any suitable manner (e.g., manual user input at the oven user interface).

In some variations, as shown in FIG. 13, user information associated with the user identifier (e.g., demographic data, biometric data, food allergies, favorite foods, user feedback) can be used to generate a user profile. The user profile can be manually generated by the user, automatically generated (e.g., based on the preferences of a user's social network, extracted from the user's social networking system accounts, based on historic cooking sessions, etc.), or otherwise generated. The user profile can function to determine information associated with a user in order to facilitate cooking parameter updates, user identification, and/or other suitable purposes. The user profile can include: user identifiers (e.g., user account credentials, etc.), cooking parameters (e.g., preferred set of operation instructions; recorded oven parameters; updated operation parameters associated with foodstuff parameters; completed cooking sessions; etc.), food classes (and/or subclasses) associated with each cooking session (e.g., manually determined, automatically determined, such as with image analysis techniques applied to in-situ images sampled by the in-situ camera during the cooking session), actual oven parameter values or cooking parameter values for each cooking session (e.g., actual heating element output, actual cavity temperature), actual foodstuff parameter values for each cooking session (e.g., actual internal temperature), user feedback (e.g., subjective food parameters) for a cooking session or food class, user device parameters (e.g., registered user devices, associated permissions for accessing data from the user device and/or for operating the user device), auxiliary system parameters, and/or any other suitable information. However, cooking profiles can be configured and implemented in any suitable manner, and/or as described in U.S. application Ser. No. 15/147,705 filed 5 May 2016 and incorporated in its entirety by this reference.

2.3.4 Food Class

Food class functions as a reference label to identify a specific type of foodstuff (e.g. "broccoli", "chicken", "bacon"), and can be linked to any other data related to the food class, such as a range of target food output conditions for the food item, a range of operation instructions, and the cooking session identifier. In some variations, the food class can be represented with a food identifier used by the system (e.g., an alphanumeric code), an image of the foodstuff, or otherwise represented. The food class can optionally be presented to the user (e.g., an image of the associated foodstuff) or otherwise used. The food class can additionally or alternatively be associated with a set of operation instructions, target food output conditions, and/or any other suitable cooking parameter. The target food output conditions can, in turn, be associated with a set of objective parameter values (e.g., "brownness") that can be determined from sensor measurements (e.g., from in-situ images). The food class can optionally be associated with one or more adjustment models 70 (e.g., that convert a subjective parameter metric into operation instruction changes), or any other suitable analysis. The models can include: neural networks, equations, selection tables, graphs, or any other suitable model correlating a subjective parameter metric value with an operation instruction change. The food class can optionally be associated with user feedback related to historical cooking sessions for the same food class to make improved analyses in S200, user accounts, cooking session identifiers, images 55 (e.g., recorded during one or more cooking sessions, standard images, graphical representations, etc.), or any other suitable information. The food class can optionally be associated with a set of target food output conditions (e.g., specific to the food class or subclass, etc.), wherein the target food output conditions (e.g., "crispy," "moist") can each be associated with a different set of operation instructions (e.g., different temperatures, holding times, etc.). Alternatively, each food class-subjective parameter value pair can be associated with an independent set of operation instructions, wherein each pair can be adjusted using a pair-specific model. The food class can optionally be associated with the same or different subjective parameter queries. For example, cookies can be associated with "chewiness" and/or "crispiness," while chicken can be associated with "moistness" and "crispiness" (e.g., wherein the responses to the subjective parameter queries can be mapped to different adjustments for different operation instruction variables, or mapped to the same adjustment for the same operation instruction variables). However, food class can be associated with any suitable information. The information associated with the food class can be global, specific to a demographic, specific to a user profile, specific to an appliance (e.g., oven), or be otherwise shared or limited.

Food class (including food superclasses and/or subclasses) can be automatically or manually determined by various quantifiers, including: foodstuff parameters (e.g., weight, temperature, dimensions) recorded by the sensor system of the oven, foodstuff features extracted from recorded images (e.g., using image analysis modules 80), recipe parameters (e.g., ingredients, associated amounts, etc.), user-entry, and/or by any other suitable analysis of foodstuff-related parameters, described in U.S. application Ser. No. 15/147,705 filed 5 May 2016 and incorporated in its entirety by this reference.

3.2.5 Oven Operation Instructions

Figure 18:
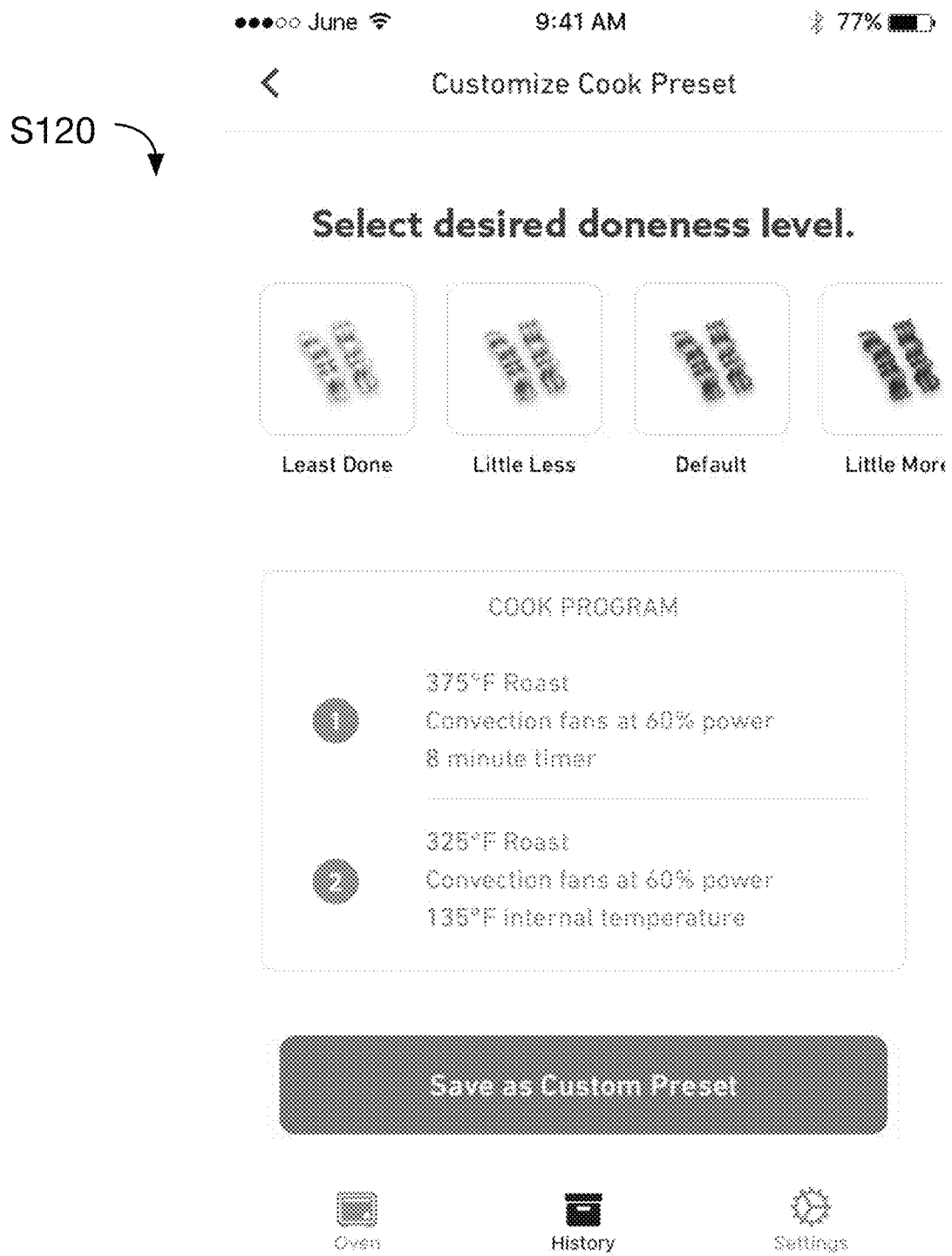
FIG. 18 depicts an example frame of a user interface for user selection of a target food output condition in a variation of an embodiment of a method.

Each cooking session executes a set of operation instructions (cooking instructions, cooking presets, recipes) used to instruct the oven to perform cooking of a foodstuff in S100. In variations, each set of operation instructions (e.g., stored in the database) can be associated with a food class (e.g., "chicken") and a target food output condition (e.g., "moist", "crispy skin") for the food class, which can be used by the system/and or the user to select, generate, or suggest an initial set of operation instructions when initiating a cooking session in S120 (as shown in FIG. 2, and FIG. 18). Furthermore, each set of operation instructions can be updated in S300 based on collected user feedback after completion of a cooking session in S200, the respective set of cooking parameter values recorded during the cooking session in S140, new user input, new preferences, new users, or any other suitable data. However, the initial set of operation instructions can be selected, generated, and/or updated in any other suitable manner, and as further described in the Methods section below.

Operation instructions can include oven operation instructions, target cooking parameter values (e.g., target oven parameter values, target foodstuff parameter values), user-oven interaction instructions (e.g., instructing the user to open the oven door when airflow provided by the fans is insufficient), or include any other suitable instruction. Target cooking parameter values are preferably intended to be achieved (e.g., via recording of instantaneous cooking parameter values by the sensor system 700 in S140) by the system, and can be for a given stage in the cooking process (e.g., minutes after foodstuff introduction into the cavity), a target endpoint parameter (e.g., associated with a target food output condition when the foodstuff is removed from the oven, and/or ready for consumption), or be any other suitable target parameter.

In an embodiment, the target cooking parameter values of the operation instructions associated with a food class preferably include a series of controlled target oven parameters (e.g., temperature, duration) and expected target foodstuff parameters (e.g., internal food temperature, food weight), wherein each parameter has a value (e.g., 350° F., 10 minutes), but can include any suitable information. The selected target food output condition (reflecting a subjective food parameter) preferably changes the value of the target cooking parameter values, but can alternatively or additionally change the order of the series of controlled target oven parameters, change which parameters are included in the series, or otherwise change the operation instructions. Different target food output conditions can be associated with different oven parameters and/or foodstuff parameters or be associated with the same oven and/or foodstuff parameters. For example, "crispiness" can be associated with adding a high-heat application step (e.g., as a last step), while "doneness" can be associated with holding the foodstuff at an existing step for a longer duration. The association between the target food output condition and the oven parameter adjustment can be: empirically determined, iteratively determined, determined by training a neural network, or otherwise determined.

In a first variation, operation instructions can include target oven parameter values (e.g., wherein the oven automatically converts the target oven parameter values into control instructions, such as based on predetermined conversion rules, iterative control adjustment and oven parameter value monitoring, etc.), component control instructions, oven parameter value patterns (e.g., target oven parameter values associated with predetermined timestamps), oven parameter values associated with foodstuff cooking states, oven operation states (e.g., on, off, standby, etc.), or any other suitable operation instruction. Examples of operation instructions generated from target oven parameter values include: temperature schedules for the oven cavity; control instructions for a set of heating elements 300, such as the amount of power to supply to each individual heating element; control instructions for a set of fans, such as the rotation speed for each individual fan; or be any other suitable oven operation instruction at any given time during a cooking session. However, any other suitable cooking instruction can be generated.

In a second variation, operation instructions can include target foodstuff parameter values (e.g., wherein the oven determines control instructions based on target sensor data to be sampled by the sensor system of the oven and intended to occur at specific time points to achieve the associated target food output condition). Examples of target foodstuff parameter values can include: internal food temperature, foodstuff weight changes, humidity changes within the oven cavity, the amount of bread browning, amount of skin or surface crispness, water content of the foodstuff, water ratio of the foodstuff, denatured protein uniformity throughout the foodstuff, volume of a predetermined sound frequency (e.g., corresponding to a cooking stage), duration that a predetermined sound frequency has been substantially maintained, a weight loss ratio, and a threshold concentration of a given volatile or aromatic compound being released (e.g., 5 g/L, mol/L, etc.). However, the target food parameter can be any other suitable parameter that can be ascertained by the sensor system of the oven.

Figure 14:
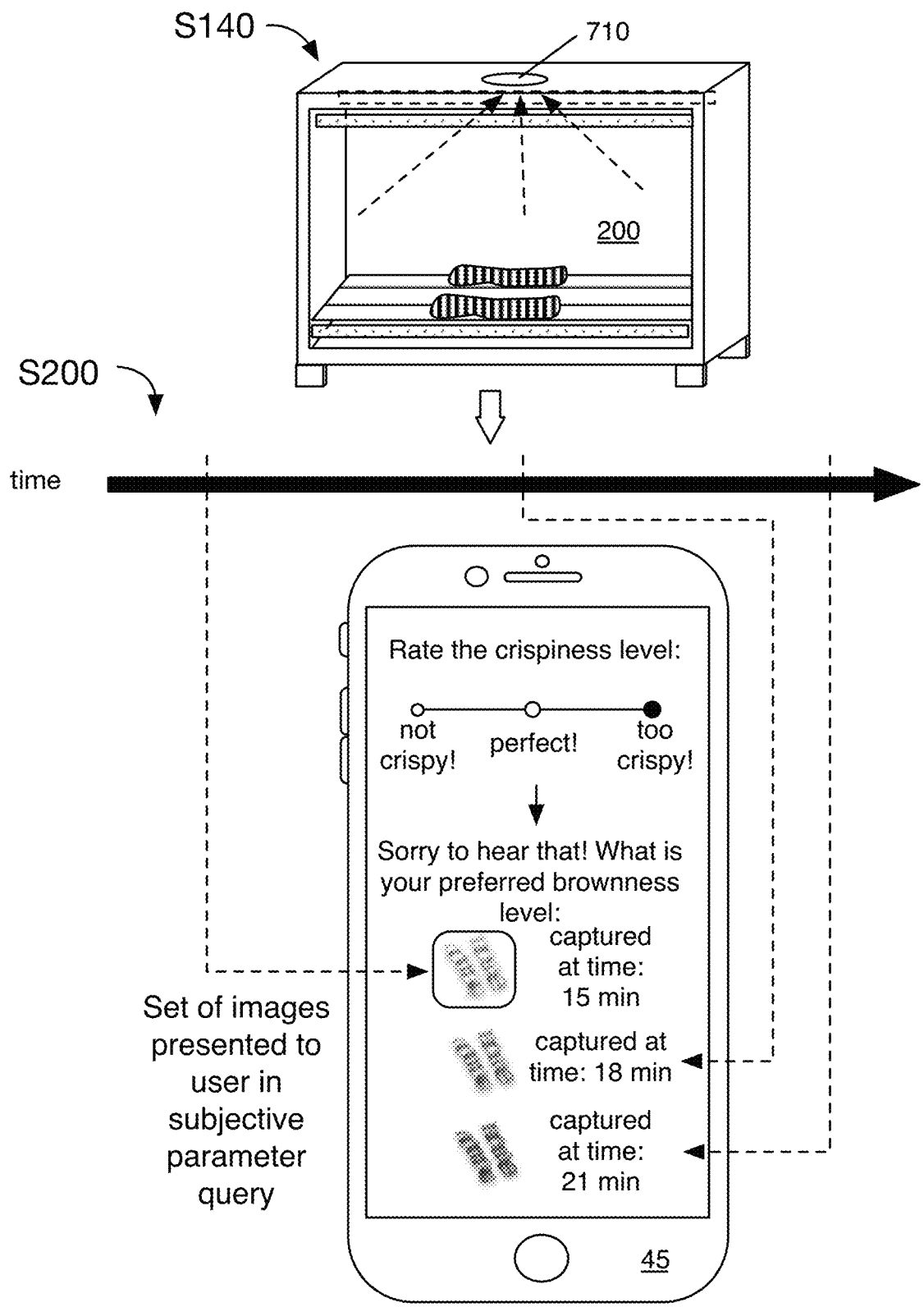
FIG. 14 is a schematic representation of collecting feedback values in a variation of an embodiment of a method.

In some variations, a subset of a set of operation instructions can be represented to the user using an image or set of images of the foodstuff at various stages of a cooking session using the respective set of operation instructions, wherein each image is associated with specific oven parameter values and/or food parameter values (and/or series thereof) (e.g., FIG. 14). However, the set of operation instructions can be presented to the user in any other suitable manner.

2.3.6 Cooking Parameter Values

Cooking parameter values, determined by the sensor system of the oven in S140, functions to determine instantaneous cooking parameter values for a given stage or time during a cooking session. In variations of the method, cooking parameter values can include oven parameters (temperature, heating element settings, etc.) and foodstuff parameters (e.g., internal food temperature, humidity of the chamber, weight of the foodstuff), and/or any other suitable output of the oven as a result of the initial set of operation instructions. In another aspect, the cooking parameter values can be associated with user feedback values (e.g., subjective food parameter values such as: "under done", "slightly undercooked", "perfect", "slightly overcooked", "over done", etc.). In this variation, the user feedback values can be collected after the cooking session is completed in S200 and be associated with an image 55 (e.g., the last image in the series), as shown in FIG. 24, wherein the cooking parameter values associated with the image can also be associated with the user feedback value and/or subjective food parameter value. The target cooking parameter values (e.g., of the initial operation instructions) can optionally be updated (e.g., scaled, incremented, decremented, added, removed, etc.) based on the updated subjective food parameter value—cooking parameter value association. Furthermore, cooking parameter values can be processed by the computing system 20 to determine: alignment or variances between instantaneous sensor data and intended sensor data (e.g. comparisons between cooking parameter values in real-time vs. target oven/food parameters), sensor measurement patterns over time, associations between a first and second sensor measurement (e.g., a ratio, etc.), or any other suitable characterization that may assist in generating more accurate adjustments to the set of cooking instructions and/or operation of the oven, as further described in the Methods section below.

Cooking parameter values are preferably received at the remote computing system 20 from the oven 100 (e.g., directly transmitted through WiFi from the oven to the remote system; transmitted through Bluetooth from the oven to a user device, which can transmit the cooking parameter values to the remote system; etc.), but can additionally or alternatively be received directly from the user device 40, auxiliary systems, and/or other suitable components, as further described in the Methods section below.

Oven parameters of the cooking parameter values can include: oven temperature parameters (e.g., temperature within the cooking cavity over time, temperature gradients, averages, temperature of the housing in relation to whether the oven is safe to touch, etc.), fluid parameters (e.g., airflow, fluid paths, volume, rate, direction, etc.), electromagnetic emission parameters, heating element parameters (e.g., which heating elements are activated, etc.), convection element parameters (e.g., which convection elements are activated, etc.), sensor parameters (e.g., sensor measurements sampled at the oven sensors in association with a cooking session, etc.), light parameters (e.g., light intensity within the cooking cavity, etc.), foodstuff position within the oven cavity, and/or any other suitable oven-related parameters.

Examples of foodstuff parameters include color images (e.g., video or single images), thermal images, information derived from images, surface temperature (estimated or actual), internal temperature (estimated or actual), temperature gradients, humidity (e.g., internal or external), weight, weight distribution, volatile molecule composition, water content of food item, water ratio of foodstuff, volume of a predetermined sound frequency (corresponding to a cooking stage), duration that a pre-determined sound frequency has been substantially maintained, weight loss ratio, threshold concentration of a given volatile or aromatic compound being released (e.g., 5 g/L, mol/L, etc.) or any other suitable foodstuff parameter. In preferred embodiments, foodstuff parameters include images and/or video recorded by the optical sensors of the oven, from which foodstuff features (e.g., color, shape, texture, etc.) and associated subjective food parameter values can be extracted, as further described in the Methods section below and in U.S. application Ser. No. 15/147,705 filed 5 May 2016 and incorporated in its entirety by this reference.

2.3.7 User Feedback

Figure 16:
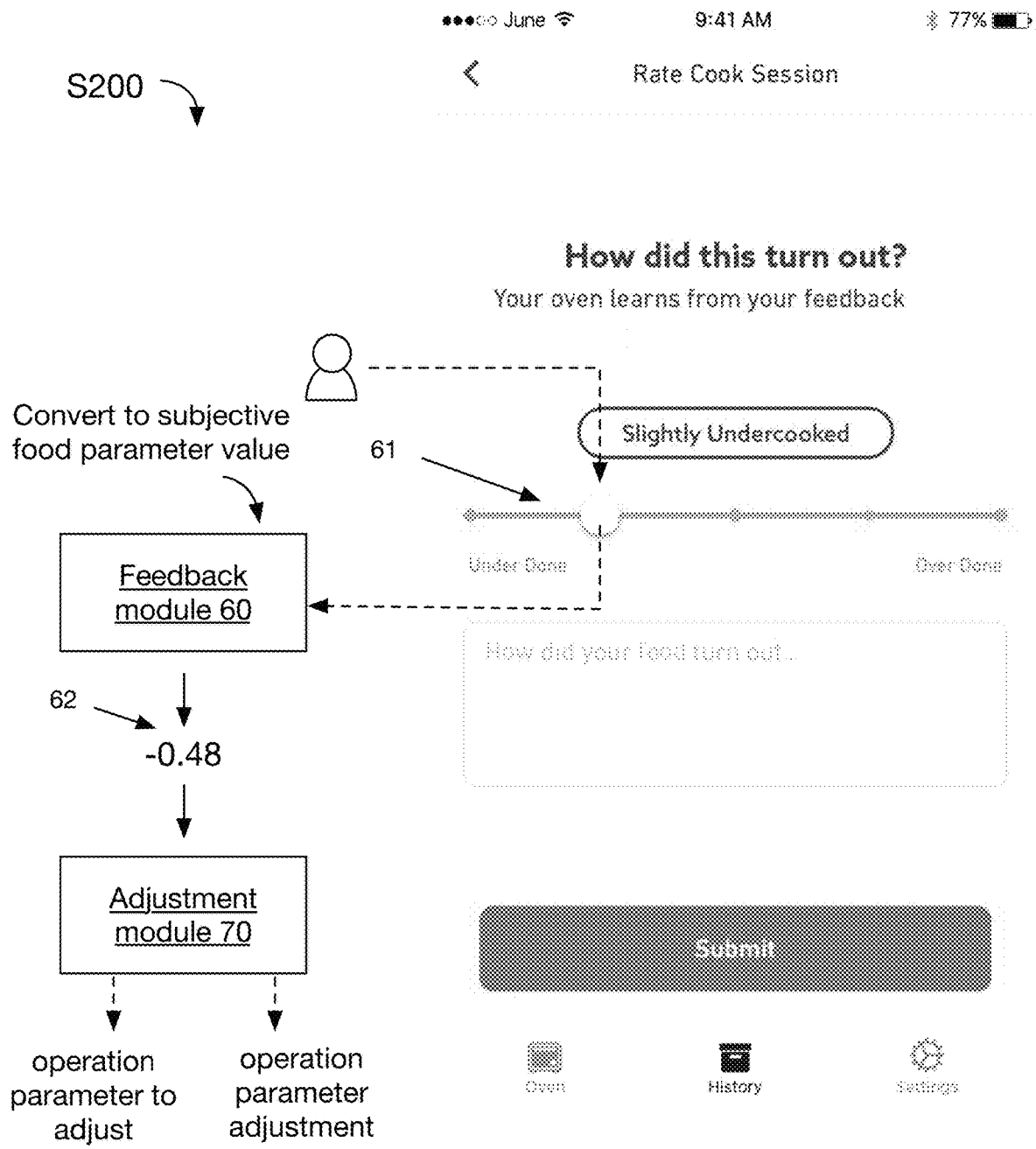
FIG. 16 is a schematic representation of collecting feedback values in a variation of an embodiment of a method.

User feedback (e.g., associated with each user identifier, user population, etc.) functions to assign subjective descriptors (e.g., subjective food parameter values) to cooking parameter values generated by the initial set of operation instructions, and to trigger adjustment of operation instructions in S200, in order to tailor cooking sessions to better achieve a target food output condition. In variations of the method, user feedback values regarding a subjective food parameter (e.g., "doneness", "crispness") of the food output condition (e.g., "moist") for a foodstuff (e.g., "chicken") are collected from the user after completion of a cooking session in S200, via a subjective query response to a subjective query at the user interface. In one variation, the processing system of the computing system (e.g., via feedback module 60) can convert the subjective query response (feedback value 61 e.g., "overdone") into a subjective food parameter value 62 (e.g., "10" on a 1 to 10 scale, with 5 being perfectly cooked) which can be correlated to cooking parameter values (e.g., time, temperature settings) that were recorded by the sensor system of the oven. The subjective food parameter values can be used to adjust the set of operation instructions (e.g., decrease time by 10 minutes, decrease temperature by 5 deg) to achieve the target food output condition in a subsequent cooking session (FIG. 16). However, user feedback can be obtained and/or processed in any other suitable manner, and/or as described further in the Methods section below.

User feedback (e.g., subjective query responses) is preferably received at the remote computing system from the user interface (e.g., directly transmitted through WiFi from the remote user device to the remote system; transmitted through Bluetooth from the user device to the oven, which can transmit the subjective query responses to the remote system; etc.), but can additionally or alternatively be received directly at the oven, auxiliary systems, and/or other suitable components, as further described in the Methods section below.

User feedback (feedback values 61) can be received in the form of numerical values, textual descriptions, graphical representations, a selected image from a set of images, a selected position on a slider (e.g., wherein the position can be associated with a subjective food parameter value), or any other suitable form, and is preferably subsequently processed into and stored as subjective food parameter values 62 (examples in FIGS. 14-17, FIGS. 22-24). Alternatively, the subjective food parameter values 62 can be the feedback values 61, or be otherwise related to the feedback values 61. In a first variation, the user can select from a range of descriptive words or images associated with predetermined subjective food parameter values 62. The subjective food parameter values 62 can be discrete (e.g., binary, integers, etc.) or be along a continuum (e.g., from −1 to 1, where negative values can be associated with negative sentiments or feedback, and positive values can be associated with positive sentiments or feedback, etc.). The feedback values (or range thereof) received in a query response can be mapped to a subjective food parameter value or otherwise associated with (or determined from) the feedback values. In a second variation, the user can interact with a graphical object (e.g., images representing positive and negative emotions, a graphical slider, an interactive graph) wherein the selection or positioning of the graphical object is associated with a subjective food parameter value 62. In a third variation, the user can manually assign a subjective food parameter value 62 for a subjective food parameter of the food output. However, the correlation of the subjective query response to a subjective food parameter value can occur in any other suitable manner, and further described in the Methods section below.

The user feedback that is collected from the user can be stored at the database of the remote computing system in association with the user identifier and/or user profile, with a particular food class that was the subject of the feedback, and/or with the cooking session identifier (e.g., FIG. 22). However, user feedback can be alternatively stored in association with any other suitable information collected by the system, by any other suitable means.

3. Smart Cooking Method

The method for tailoring cooking operation instructions can include: executing a cooking session S100, including determining an initial set of operation instructions S120 used to perform the cooking session and collecting cooking parameter values S140 for the cooking session; collecting feedback from the user S200 regarding a subjective food parameter of the food output, and generating an updated set of operation instructions S300. The method can be performed by the system disclosed above (e.g., the oven 100, the user interface 30, and the computing system 20), or be performed with any other suitable system.

3.1 Execute Cooking Session

Executing the cooking session S100 functions to cook a foodstuff to achieve a target food output condition for the foodstuff, and can include: determining an initial set of operation instructions used to perform the cooking session in S120, and collecting cooking parameter values for the cooking session in S140.

3.1.2 Determining an Initial Set of Operation Instructions

Determining the initial set of operation instructions for a cooking session S120 functions to determine oven inputs (target oven parameter values) that are anticipated to produce a target food output condition for a particular foodstuff (e.g., within a food class). As previously described, the set of operation instructions can be based on target cooking parameter values (e.g., oven parameters, foodstuff parameters) for given stages throughout the cooking session, but can additionally or alternatively be based on any other suitable instruction. As shown in FIG. 2 and FIG. 18, the operation instructions are preferably determined based on the food class of the foodstuff within the appliance cavity, and can optionally be determined based on the target output food condition, the target foodstuff parameters (e.g., temperature, weight, size, perimeter, etc.), or any other suitable variable. In an example, an initial set of operation instructions for food class: "chicken" with target output food conditions: "crispy skin" and "moist" can include a heating element temperature profile including a first time period of elevated temperature for all heating elements 300, a second time period of low temperature for the heating element distal the chicken, a schedule for the internal temperature of the chicken recorded by a food thermometer, and a third time period of broiling temperature for the heating element proximal the chicken (e.g., proximal the skin-side of the chicken), to begin when the internal temperature of the chicken has reached a specific temperature. However, the initial set of operation instructions can be otherwise configured and can include any other suitable combination of instructions.

The initial set of operation instructions are preferably stored and determined at the remote computing system 20 (e.g., directly transmitted through WiFi from the remote system to the oven), but can additionally or alternatively be stored and/or determined at the remote user device 40 (transmitted through Bluetooth from the user device to the oven, etc.), a secondary user's device, at the oven itself, or any other suitable computing system. In variations, the initial set of operation instructions is selected from amongst a plurality of sets of operation instructions that can be stored at the database of the computing system. The operation instructions can be retrieved from the oven's on-board storage (e.g., wherein the oven stores recipes for each of a plurality of foodstuff classes), from a remote computing system, or from any other suitable endpoint.

The initial set of operation instructions are preferably determined prior to the cooking session, and in response to receipt of the user confirmation (e.g., receipt of the operation instruction selection), but can alternatively be determined in response to foodstuff detection within the cooking cavity, be determined in anticipation of foodstuff insertion into the cavity (e.g., based on a secondary cooking apparatus, a mealplan, a calendar, etc.), or be determined at any other suitable time, and as further described in variations below.

In a first variation, the oven can cook food based on a predetermined set of operation instructions for a particular food class and/or a specific target food output condition for the food class. In a first example, selection of an initial set of operation instructions from the plurality of sets of operation instructions can be achieved by user selection (e.g., selection of a target output food condition, selection of a food class). In a specific example, as shown in FIG. 2 and FIG. 18, the user can interact with the user interface, which presents the user with a series of queries whereby the user can specify a preference for food class and additionally or alternatively, a target output food condition for the food class. Upon receiving the user input at the user interface, the computing system can retrieve a set of operation instructions that can be transmitted to the oven as the initial set of operation instructions used to cook the food stuff.

Figure 3:
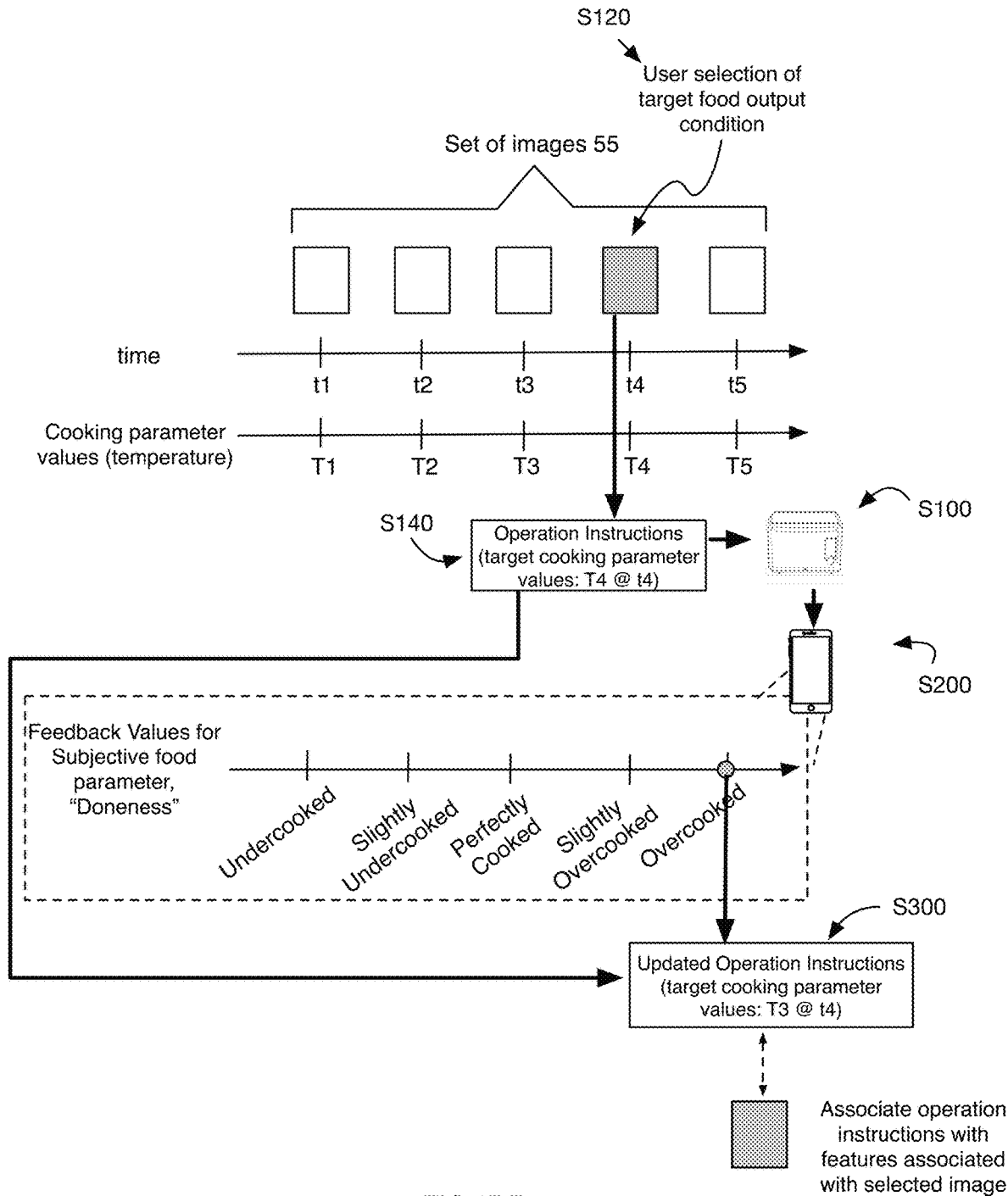
FIG. 3 is a schematic representation of a variation of an embodiment of a method.

In a second example, as shown in FIG. 3, the user interface can present the user with a range of images of a foodstuff at different stages of a cooking session, wherein each image can optionally be associated with a timestamp and cooking parameter values executed up to the timestamp. Upon selection of the image (e.g., visual representation a target food output condition) by the user, the computing system can transmit a set of operation instructions to the oven, wherein the set of operation instructions corresponds to the operation instructions executed up to the timestamp of the selected image.

In a third example, the user interface can present the user with a directory of historical cooking sessions for the food class of the foodstuff, wherein each cooking session is associated with a respective set of operation instructions used for that cooking session (e.g., via the cooking session identifier). In this example, the user can select the initial set of operation instructions by selecting the associated cooking session (e.g., via an image recorded during the cooking session, a textual description, etc.). However, the initial set of instructions can be determined based on any user preferences received from the user, and at any suitable user interface (e.g., at the remote device, at the oven).

In a second variation, the initial set of operation instructions can be provided or augmented (e.g., custom-input) by the user, a secondary user, the primary user, or by any other suitable entity.

The user-specified operation instructions can be received before foodstuff insertion into the cooking cavity, after foodstuff identification, before control instruction retrieval, after control instruction retrieval, during the cooking session (e.g., wherein the oven dynamically responds to the operation instructions), or at any other suitable time.

The cooking instructions can be received directly at the oven (e.g., over a short-range communication channel), indirectly through the remote computing system (e.g., through a long-range communication channel), or otherwise received from the user device.

In a first variation, the preferences of a user used to determine user-specified operation instructions can be received from the user, wherein the user can be a primary user, user proximal the oven during the foodstuff insertion event (e.g., connected to the oven via a short-range communications channel, determined from a user image, etc.), or any other user; preferences of a user population (e.g., average parameter value, etc.); specified by an entity (e.g., a chef); recommended parameters (e.g., from food safety agencies, etc.); or be determined in by any other suitable entity. In a specific example, the user can make a customized, user-specified set of operation instructions (e.g., 375 F roast with convection fans at 60% power for 8 minutes for food class: "bacon" cooked to target food output condition: "crispy" for subjective food parameter: "doneness"), which can be stored in the database.

In a second example, the set of operation instructions input by the user can additionally be automatically adjusted by the computing system to meet the primary user's preferences. In a specific example, the user can select to author a "new recipe" on a user device and enter the ingredients and/or general cooking steps desired. The computing system can create a new recipe file in response to the authoring selection, and automatically populate the recipe with a set of operation instructions associated with the listed ingredients and/or general cooking steps, based on historical cooking sessions, crowd-sourced data, historical user data and/or any other suitable information. However, preferences of the user can be determined in any other suitable way.

Figure 19:
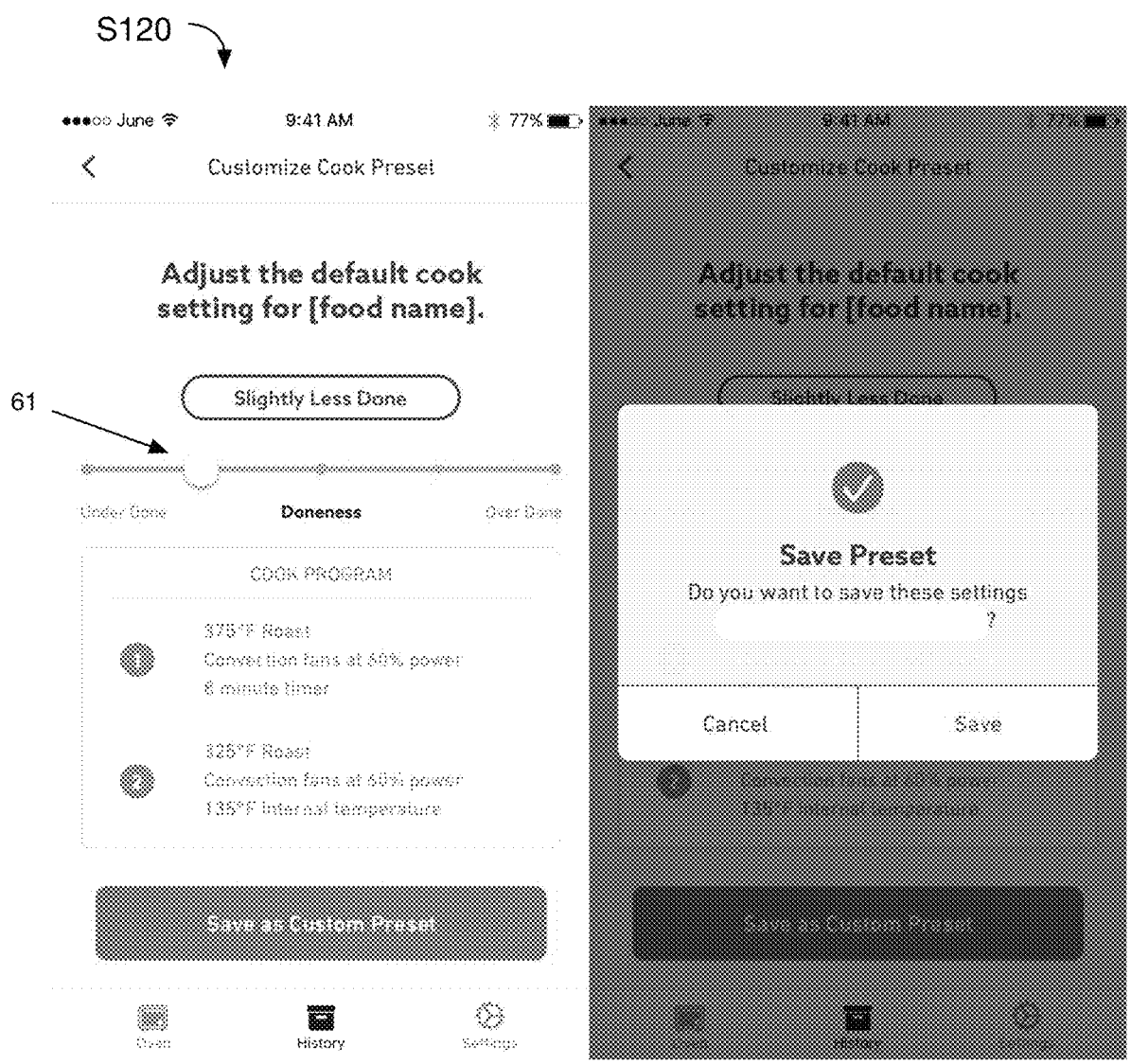
FIG. 19 depicts example frames of a user interface for user creation of a custom cooking preset in a variation of an embodiment of a method.

In a second variation, the user input can be used to modify a predetermined set of cooking instructions, be used in lieu of the predetermined set of cooking instructions, or be otherwise used. In an example, as shown in FIG. 19, the method can include receiving a new input for a target food output condition from the user device (e.g., "crispier") at a stage during the cooking session, determining oven operation instructions to achieve the new target food output condition based on the instantaneous oven operation parameters (e.g., by the oven or remote computing system), and control the oven to operate according to the determined operation instructions. In a specific example, the method can include receiving cooking element operation instructions (oven parameters) from the user device (e.g., increase right fan speed, rotate both fans in the same direction, rotate both fans in opposing directions, increase the heat output by the back heating element, etc.) and automatically operate the cooking element according to the cooking element operation instructions. However, the user-specified operation instructions can be otherwise utilized.

In a third variation, the user-specified operation instructions can additionally be used to adjust subsequent cooking instructions for the same or related food classes for the user (e.g., as a training set to determine the ideal set of cooking instructions for a food class), oven, general population of ovens, and/or general population of users. In an example, multiple cooking instructions can be received from multiple users cooking similar foodstuff in their respective ovens, wherein the remote computing system can generate a new set of common cooking instructions for the foodstuff class based on the multiple users' cooking instructions. The new set of common cooking instructions can be subsequently pushed to all ovens, the respective ovens, or any other suitable oven, wherein the receiving ovens subsequently use the new set of common cooking instructions to cook the foodstuff class. The new set of common cooking instructions can be an average of the received cooking instructions, a mean of the received cooking instructions, the most popular cooking instructions (e.g., cooking instructions shared between the received instructions), or be otherwise determined.

In a third variation, the operation instructions can be automatically determined by the processing system, based on historical user data, user preferences, and or population data from global cloud server. The operation instructions can additionally or alternatively be specific to the user associated with the cooking session, the oven, a set of users (e.g., sharing a common parameter), or otherwise specified. As previously described, the user associated with the cooking session can be identified through: the identifier for the user device connected to oven temporally proximal the foodstuff insertion event, biometrics (e.g., received from oven user input during foodstuff insertion, selection entry, etc.), or otherwise determined.

In a first example, upon determining a user identifier associated with the user initiating a cooking session, and receiving a selected food class, the computing system can determine an initial set of operation instructions based on frequency of use a particular set of operation instructions by the user for the food class, historical user feedback regarding operation instructions used for the food class, or any other suitable data associated with the user identifier and/or stored within a user profile for a particular user or user profiles for a user population (e.g., FIG. 20).

In a fourth variation, the operation instructions can be automatically determined based on an identified food class, a foodstuff identifier (e.g., bar code, QR code, etc.) associated with a food class, dynamically determined by the oven or remote computing system (e.g., based on the foodstuff parameters, such as weight, starting temperature, ambient humidity, etc.), specified in a recipe, or otherwise determined.

In a first example, as shown in FIG. 22, foodstuff insertion into the oven cavity can trigger the sensor system of the oven to record foodstuff parameters about the foodstuff (e.g., images, weight, etc.). The sensor data can then be processed by the computing system (e.g., at image analysis module 80), or alternatively, the processing system of the oven, to extract foodstuff features that can be correlated to a food class for the foodstuff (e.g., as discussed in U.S. application Ser. No. 15/147,705 filed 5 May 2016 and incorporated in its entirety by this reference, etc.). In some variations, the oven, remote computing system, user device, or other computing system can classify the foodstuff, using an image analysis module 80. The image analysis module 80 can be stored locally (e.g., on-board the appliance), stored on a user device, stored in a remote computing system, or otherwise stored. Upon determination of the food class, which can optionally include transmitting a query to the user at the user interface to verify the food class, the computing system can retrieve a set of operation instructions that can be transmitted to the oven as the initial set of operation instructions used to cook the food stuff. In an example, as shown in FIG. 22, the method can include: sampling an image of the foodstuff within the cooking cavity; classifying the foodstuff based on the image (e.g., using computer vision techniques, classification techniques, etc.); and automatically selecting a set of operation instructions based on the foodstuff class (e.g., wherein the operation instructions are associated with the foodstuff class). The method can optionally include determining the target output food condition for the food class. Determining the target output food condition can include automatically selecting the target output food condition (e.g., wherein the target output food condition is a default value, is determined from user preferences, etc.), manually selected (e.g., wherein the available target output food conditions for the food class can be presented to the user), or otherwise determined. The operation instructions can be selected, modified, or otherwise determined based on the target output food condition.

In a second example, the operation instructions can be retrieved based on an identifier, such as a QR code, a barcode, or any other suitable identifier associated with the food class, that can be scanned from the food or food packaging in-situ, or otherwise determined. The identifier can be extracted from the images recorded by the oven, identified by a code reader on the oven, identified by a code reader on the user device, received from the user interface unit, or identified in any other suitable manner.

3.1.3 Collect Cooking Parameter Values for a Cooking Session

Collecting cooking parameter values for a cooking session S140 functions to generate a set of raw data with which to monitor the cooking session, and includes using the sensor system of the oven to obtain current (e.g., instantaneous) oven parameters and foodstuff parameters occurring during a cooking session. In variations, the cooking parameter values can be additionally and/or alternatively used to classify the food class of the food item, extract food parameters for dynamic adjustment of operation instructions, to update the initial set of operation parameters (e.g., to connect cooking parameter values with subjective food parameter values for the food output), generate data training sets (e.g., supervised or unsupervised), or perform any other suitable downstream process. However, the cooking parameter values can be utilized in any other suitable manner.

The cooking parameter values are preferably stored in association with a timestamp, an oven identifier, and/or a cooking session identifier, but can be stored in association with any other suitable information. The cooking parameter values can be associated with the set of operation instructions used in the respective cooking session (e.g., a target food output condition for the set of operation instructions), a user preference (e.g., wherein the cooking parameter values can be analyzed to extract a cooking preference for the user), or associated with any other suitable information generated from the respective specific cooking session for downstream analysis.

The cooking parameter values can be recorded by the sensors of the oven, by a user device associated with the oven (e.g., a mobile device electrically connected or wirelessly connected to the oven), by an auxiliary device (e.g., a temperature probe), by a secondary connected device (e.g., a connected weight, a connected refrigerator, a connected sous vide machine, etc.), or be measured by any other suitable component. The sensors used to record the measurements can be preferably non-contact sensors, contact sensors (e.g., probes), or any other suitable sensor, as described in the System section above.

Cooking parameter values can be collected for a single timestamp, or across a time period. Cooking parameter values can be recorded at a predetermined frequency (e.g., during the cooking session), in response to the occurrence of a recording event (e.g., in response to occurrence of a food insertion event, in response to receipt of a query from a user device, in response to expiration of a cooking timer, etc.), in response to other trigger events (e.g., manual selection by the user to upload cooking parameters; stored cooking parameter data at the oven exceeding a data type or data amount threshold; data pull requests generated by the remote system and transmitted to the oven and/or user device; system alerts, etc.); and/or at any suitable time and frequency. Measurements from different sensors can be concurrently recorded or asynchronously recorded (e.g., within a predetermined time duration, separated by a predetermined time duration, etc.), or otherwise recorded. However, the oven measurements can be otherwise recorded.

All or a subset of the cooking parameter values can be sent from the oven to the remote computing system and/or user device. In a first variation, the cooking parameter values can be sent to the remote system by the oven, by a user device associated with the oven (e.g., a mobile device electrically connected or wirelessly connected to the oven), by an auxiliary device (e.g., a temperature probe), by a secondary connected device (e.g., a connected weight, a connected refrigerator, a connected sous vide machine, etc.), or be sent by any other suitable component. In a first example, collecting the cooking parameter values for a cooking session can include recording the cooking parameter values by the sensor system of the oven, sending the cooking parameter values to the remote computing system, and storing the cooking parameter values in association with a user identifier at the remote system. However, the oven measurements can be otherwise sent to the remote system, used by the oven itself, sent to the user device from the oven (e.g., live stream of a video of the oven cavity to the remote user device), or otherwise managed.

The cooking parameter values are preferably transmitted during the cooking session, but can alternatively be transmitted after completion of the cooking session. The oven measurements can be sent in real- or near-real time (e.g., streamed), sent periodically, sent in response to receipt of a request, or sent at any other suitable time. In one example, the oven can stream a video of the oven cavity and/or foodstuff being cooked to the remote system. In a second example, the oven can record and/or send sensor measurements to the remote system: periodically, in response to the occurrence of a trigger event (e.g., food insertion event, send event, etc.), or at any other suitable time.

Once received at the remote computing system, collected sensor data can provide a rich source of data from each cooking session from which to develop cooking instructions, updated identification modules, or other data structures. In some variations the remote computing system can additionally use the oven measurements from one or more ovens over one or more cooking sessions to automatically: accommodate for sensor degradation or calibration slip), generate an average cooking curve for a foodstuff class, create oven measurement visualizations (e.g., charts, .gifs, etc.), generate foodstuff predictions (e.g., finish time, etc.), perform population-level analyses (e.g., most common food for a given location or demographic), or otherwise use the oven measurements. The remote computing system can optionally stream all or a portion of the received oven measurements to a user device, user-specified endpoint (e.g., URI, received from the user device or otherwise associated with the user account), or other endpoint (e.g., in response to application activity, etc.), wherein the remote computing system can identify the second endpoint in response to oven measurement and/or other trigger condition receipt.

In a first variation of collecting cooking parameter values, the method can record a series of images 55 using the camera 710 or other optical sensors of the sensor system 700. The images are preferably stored in association with a timestamp, but can additionally and/or alternatively be stored with any other information associated with the respective cooking session, such as other cooking parameter values, cooking session identifiers, and food class. Once recorded and transmitted to the remote computing system, the images and associated information from the cooking session can be used to determine foodstuff features that can be used to identify the foodstuff using image classification modules, monitor foodstuff cooking progress for downstream dynamic oven control, interpret subjective food parameter values collected from user feedback, and/or be used in any other suitable manner (e.g., FIG. 14, FIG. 15, FIG. 21, FIG. 22). The foodstuff features extracted from an image are preferably determined by the remote computing system, but can alternatively be entirely or partially determined by the processing system onboard the oven.

Foodstuff features that can be extracted from the image (e.g., via image analysis module 80) can include foodstuff shape, size (e.g., physical size), color (e.g., average color, color gradients, etc.), contour, texture, number (e.g., count), spatial distribution (e.g., foodstuff mass to the right or left of the cooking cavity), or any other suitable feature that can be visually determined. Additionally and/or alternatively, foodstuff features can be recognized from the image using computer-implemented techniques, using convolutional neural network methods, appearance-based methods (e.g., edge matching, divide-and-conquer searching, grayscale matching, gradient matching, histograms, large modelbases, etc.), feature-based methods (e.g., interpretation trees, hypothesizing, pose consistency, pose clustering, invariance, geometric hashing, scale-invariant feature transform, speeded up robust features, etc.), generic algorithms, or using any other suitable method. In one variation, foodstuff features are determined from the image using: per-pixel classification, pixel grouping and/or clustering (e.g., to identify like pixels), and/or cluster classification (e.g., to determine whether a group of pixels is representative of a rack, tray, foodstuff, etc.). However, the foodstuff features can be otherwise determined. In one example, the foodstuff features are determined and used as discussed in U.S. application Ser. No. 15/147,705 filed 5 May 2016 and incorporated in its entirety by this reference.

In a first variation, the images can be analyzed to extract the foodstuff cooking progress, wherein adjustments to the operation instructions can be performed during the cooking session to better achieve a target food output condition. In a first example, the system can determine that the foodstuff ("chicken") is below a threshold level of foodstuff parameter ("brownness") for target food output condition ("crispness") at a given time in the cooking session (e.g., based on image analysis) and generate heating element instructions (e.g., newly generated or by modifying a pre-existing set of instructions or recipe) to achieve the desired chicken skin crispness. The oven can subsequently receive the heating element instructions and control the heating element according to the instructions. In a second example, an initial warmup period can be extended or added in response to determination that the foodstuff is frozen or that the cooking cavity has not been preheated. In a third example, the method can include comparing the actual cooking status and expected cooking status, and adjusting the cooking instructions based on the comparison (e.g., to meet a target cooking status by a predetermined time). However, the foodstuff features extracted from the image can be used to dynamically control oven operation in any other suitable way, and as described in U.S. application Ser. No. 15/147,705 filed 5 May 2016 and incorporated in its entirety by this reference.

In a second variation, foodstuff features extracted from the images can be linked to subjective food parameter values received from user feedback in S200. In a specific example and shown in FIG. 14, FIG. 22 and FIG. 24, a set of images collected as foodstuff parameters during a cooking session can be additionally presented to a user at the user interface in the form of a subjective parameter query, whereby the user can indicate a subjective parameter value for a selected image. The same set of images can be analyzed to extract a set of foodstuff features that can be correlated to the subjective food parameter value, which can be used as training data to develop a computer-implemented model for relating foodstuff features extracted from an image to a subjective parameter value, and further associated with other cooking parameter values and a set of operation instructions for downstream analysis.

3.2 Collect Feedback Values from the User for the Cooking Session

Collecting feedback values from the user for the cooking session S200 functions to obtain user feedback concerning the degree to which a target cooking parameter (e.g., a target food output condition specified by the user prior to the cooking session) was achieved by the cooking session, and/or concerning any other suitable aspects of the cooking session. Feedback values 61 preferably provide feedback on achievement of target food output conditions (e.g., feedback concerning whether a target food output condition: "medium rare" was achieved for a food class: "steak"), but can additionally or alternatively provide feedback on any suitable aspect (e.g., user experience; smartphone application functionality; oven user interface responsiveness; aspects independent of the cooking session; etc.).

As shown in FIG. 23, feedback values are preferably provided by a user in response to a subjective parameter query (e.g., surveying the user regarding the cooked foodstuff after completion of a cooking session), but can be provided at any suitable time, frequency, or any other suitable manner with respect to the cooking session.

As shown in FIG. 5, feedback values are preferably input by a user at a user device (e.g., at an application executing on a mobile device; in an e-mail; etc.) that is directly or indirectly connected to the computing system, but can additionally or alternatively be input at a user interface of the oven and/or at any suitable component. In a first variation, a feedback interface for subjective food parameters (e.g., via a subjective parameter query) for a cooked foodstuff can be presented at the user device.

In a specific example, the method can include, after completion of a cooking session: presenting the user with a directory of completed cooking sessions, wherein each cooking session is presented with an associated image (e.g., an image recorded in-situ during the respective cooking session) as the user-facing identifier for the cooking session, receiving a selection of an image to access information associated with the respective cooking session, and presenting the user with a subjective parameter query for the respective foodstuff cooked during the cooking session. The subjective parameter query can be a slider, a text entry box, an image recorded during the cooking session or be any suitable query format. The subjective parameter query (and/or response) can be associated with the respective cooking session identifier on the backend (e.g., indirectly; via the image; etc.). The method can additionally include, at the user interface, receiving a selected value (e.g., subjective parameter value) from the user as a response to a subjective parameter query. However, collecting feedback values can be performed in any suitable manner.

3.2.1 Subjective Parameter Queries

Collecting feedback values can include actively soliciting feedback values from the user, which can include: presenting queries (e.g., providing a digital survey at the user device, a user interface of the oven, and/or other suitable component; etc.); generating and/or scheduling reminder notifications for the user to provide feedback values; controlling the oven to notify the user, such as through blinking lights and/or emitting audio; controlling an auxiliary system to solicit feedback values; and/or other suitable operations. Additionally and/or alternatively, collecting feedback values can include passively obtaining feedback values (e.g., without directly soliciting the user), which can include: analyzing historical cooking parameters (e.g., inferring a feedback value based on repeated usage of a set of cooking parameters; etc.); collecting and analyzing sensor data (e.g., processing audio sensor data to extract feedback values; processing optical sensor data of the user to infer user emotion feedback values concerning the cooked foodstuff; etc.); collecting and analyzing Internet data (e.g., extracting user sentiment from natural language processing of social media comments associated with the cooking session; inferring feedback values based on social media activity, such as posting of an image of the cooked foodstuff; scraping Internet recipes used in the cooking session; etc.); and/or any other suitable operations.

In a first variation, a subjective parameter query presented to the user at the user interface is used to actively solicit feedback values regarding a subjective food parameter (e.g., "doneness") for the food output (e.g., the cooked foodstuff).

In this variation, the user can either indirectly (e.g., selecting a feedback indicator for further processing into a subjective food parameter value) or directly (manually assign subjective food parameter values to presented cooking parameter values) indicate subjective food parameter values. However, the subjective parameter query can be configured in any suitable way to obtain a user-defined correlation between a subjective food parameter value and cooking parameter values.

In a first example, a subjective parameter query can include presenting, at a user device application, a range of feedback indicators representing a subjective food parameter for the user to select from. The feedback indicators can include any form of information used to describe the subjective food parameter (quantitatively or qualitatively), and can include: verbal (e.g., textual descriptions), numerical (e.g., positive or negative, numerical ratings for "doneness"), graphical (sliders), images, audio, and/or any other suitable feedback indictors. In a first example, as shown in FIG. 2, the feedback indicators of the subjective parameter query can include verbal descriptions of a "doneness" foodstuff parameter (e.g., "undercooked", "perfectly cooked", "overcooked"). In a second example, as shown in FIG. 5, the feedback indicators can include a graphical digital slider movable by a user to select a visual range representing a feedback value for "doneness". As shown in FIG. 16, upon receiving a user selection to the query (e.g., a subjective parameter query response), the remote system can translate the feedback values (e.g., a selection of "slightly overcooked", a position of the graphical digital slider) into quantitative subjective food parameter values (a value of "6" on a 1 to 10 scale), using a set of computer-implemented rules or computational models (e.g., feedback module 60) as described further below. However, feedback values for a subjective food parameter of a cooked foodstuff can be solicited in any other suitable way.

In a second example, as shown in a panel of FIG. 11, the subjective parameter query can include presenting the user with sensor data that can be later annotated with subjective food parameters and/or subjective food parameter values by the user. In a first example, the subjective parameter query can include presentation of a graph of foodstuff temperature over time (e.g., with the temperature measured by a temperature probe of the oven during the cooking session), and prompting the user to indicate a location on the graph where a specific "doneness" level should be associated with the different temperatures and/or times. However, subjective food parameter values can be directly assigned to any set of cooking parameter values by the user in any other suitable way.

Figure 17:
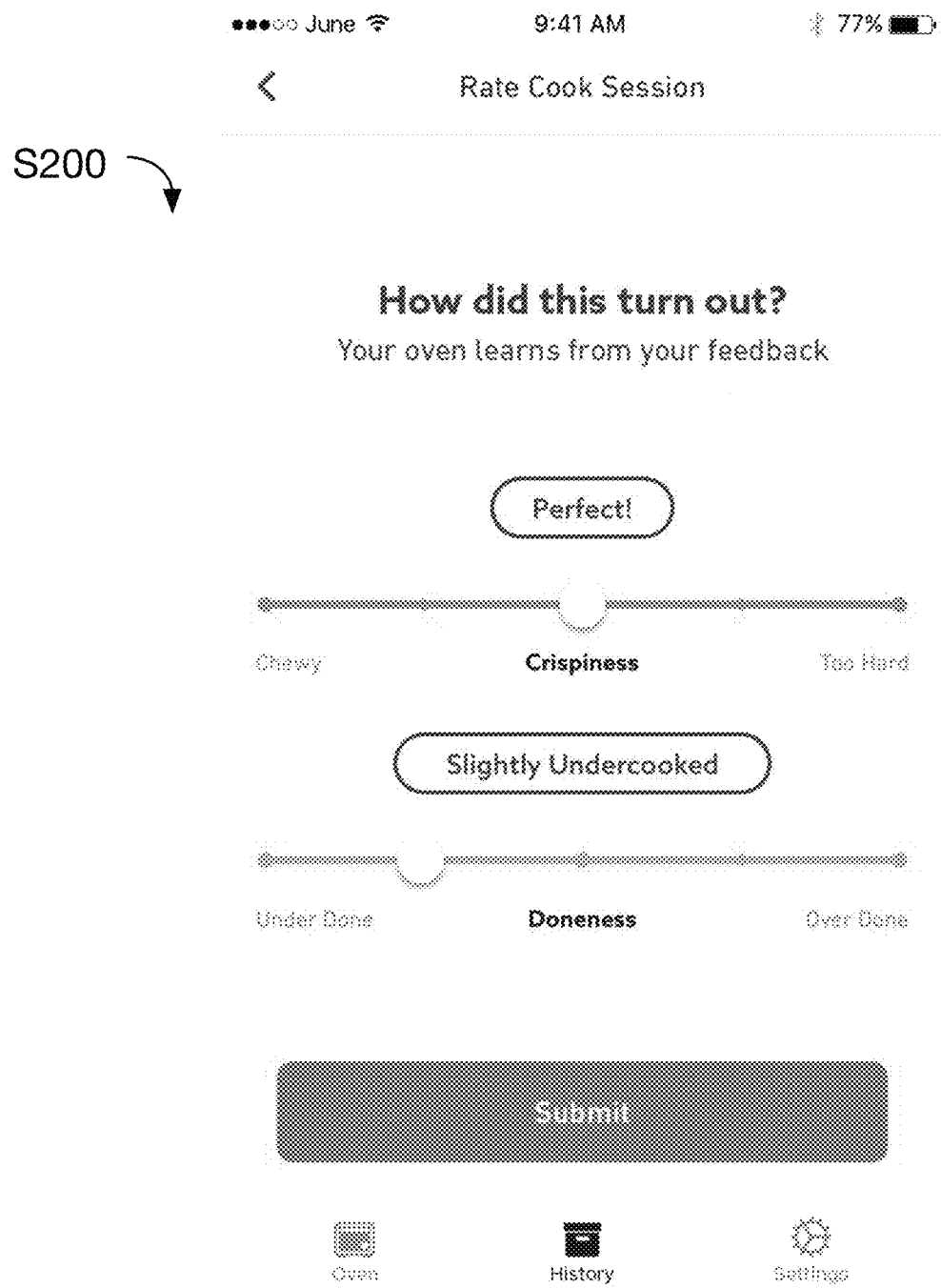
FIG. 17 depicts an example frame of a user interface for collecting feedback values in a variation of an embodiment of a method.

In a second variation, single or multiple queries can be presented to the user, for any number of feedback values for any number of subjective food parameters, associated with any number of cooking sessions. In a first example, as shown in FIG. 14, FIG. 15, and FIG. 17, multiple types of subjective parameter queries for different subjective food parameters (e.g., "crispiness" and "doneness") for the same cooking session can be presented in parallel to solicit feedback values for each of the cooking parameters, etc.).

In a second example, different types of subjective parameter queries can be presented serially. In a first example, collecting feedback values can include: ranking subjective food parameters for which feedback values are to be obtained; and serially presenting the respective subjective parameter queries in order of ranking (e.g., where a subsequently ranked subjective parameter query is only presented in response to receiving a feedback value with respect to a predetermined threshold value for a preceding cooking parameter; etc.).

In a third variation, a single feedback value can be obtained for a plurality of cooking sessions (e.g., after two or more cooking sessions for a foodstuff type using the same operation parameters, collecting a feedback value for "crispiness" associated with the two or more cooking sessions; etc.).

In a fourth variation, multiple feedback values can be received from a plurality of users for operation instructions of the same food class, wherein the system can generate an aggregate feedback value based on plurality of query responses and update instructions based on aggregate feedback value.

3.2.2 Pre-Processing Feedback Values

After collecting the query responses including feedback values from the user, the method can additionally or alternatively include pre-processing the feedback values, which functions to pre-process the feedback values into a form suitable for updating cooking parameters. Pre-processing feedback values can include any of: normalizing; ranking; standardizing (e.g., unit standardization for operation parameters across different ovens and/or auxiliary systems); smoothing; filtering; subtracting; dividing; multiplying; summing; otherwise combining; and/or any other suitable processing operations.

In a first variation, pre-processing feedback values can include converting feedback values from a first form to a second form (e.g., converting verbal feedback values to numerical feedback values based on a map relating verbal "doneness" descriptions to a scale of 1 to 5; using a machine learning model with textual features extracted from user comments to classify the verbal feedback as corresponding to a numerical feedback value for a quality foodstuff parameter; etc.).

In a second variation, pre-processing feedback values can include normalizing a feedback value with respect to a user (e.g., normalizing by a normalization factor determined based on a historical set of feedback values provided by the user, such as for a particular foodstuff parameter), a user subgroup (e.g., using a normalization factor based on feedback values provided by users in the user subgroup), cooking parameters (e.g., normalizing a feedback value for cooked bread with respect to feedback values for cooked bread across a plurality of users), and/or any other suitable criteria.

In a third variation, pre-processing feedback values can include ranking feedback values based on cooking parameter type (e.g., prioritizing "spiciness" feedback values over "saltiness" feedback values in weighting and/or selecting feedback values to use in updating a cooking parameter; etc.), user (e.g., amount of cooking feedback provided by a user for a cooking session or over time across cooking sessions; community recognition such as metrics associated with uploaded recipes; oven usage such as number of cooking sessions completed with the oven; etc.), generation of a debugging alert relating to a system error, user preferences and/or any other suitable entities. In this variation, the method can further include mapping the feedback values to changes in target operation parameters based on the weights (e.g., multiplying the first weight by the change in temperature mapped from the "crispiness" value; multiplying the second weight by the change in cooking time mapped from the "doneness" value, etc.), or used in any other suitable way.

In a fourth variation, pre-processing feedback values can include extracting feedback features that can be used in updating cooking parameters (e.g., used as inputs into a cooking parameter model). Feedback features can include any of: textual features (e.g., extracted from verbal feedback values), graphical features (e.g., pixel values of foodstuff images captured by the oven), audio features (e.g., Mel Frequency Cepstral Coefficients extracted from audio captured by the user device or oven during the cooking session), cross-user features (e.g., median feedback value of "doneness" provided by users in a particular location), and/or any other suitable features. Extracting feedback features is preferably performed with computer-implemented rules (e.g., a feature engineering rule, a user preference rule, etc.). For example, feature selection rules can be applied in selecting features purposed for optimizing: cooking speed (e.g., achieving target food output conditions while minimizing cooking time), accuracy (e.g., achieving the target food output conditions), safety, and/or any other suitable criteria. However, pre-processing feedback values can be performed in any suitable manner.

3.3 Update the Set of Operation Instructions Based on the Feedback Values

Updating a set of operation instructions in S300 preferably functions to determine and/or adjust the set of initial operation instructions for operating the oven in future cooking sessions, and can optionally include correlating the feedback values collected in S200 to cooking parameter values collected in S140. However, updates to a set of operation instructions can be made using any suitable method or data collected by the system.

Updating operation instructions is preferably performed at the remote computing system but can additionally or alternatively be performed at the oven, a user device, and/or any other suitable device.

Updating a set of operation instructions preferably occurs upon receiving feedback values from the user at S200, after a cooking session has been completed. However, updates to operation instructions can occur at any other suitable time, such as during execution of the cooking session, prior to the initiation of a cooking session, periodically, after a threshold volume of negative feedback has been received for the food class or operation instructions (e.g., for a population, a user, an appliance, etc.), or at a pre-determined frequency. In a first variation, feedback value satisfaction of an adjustment condition can trigger the computing system to update the set of operation instructions. The adjustment condition can be a predetermined, automatically determined, or manually determined threshold value, a frequency threshold for repeated responses for a specific value, a range of values, a changing rate of feedback value responses, or any other set of metrics used to determine that the initial set of operation instructions should be augmented (e.g., when the feedback from the cooking session is not positive, the food output condition did not achieve the target food output condition). In a first example, upon receiving a feedback value for a subjective food parameter of "overcooked" in response to a first subjective parameter query (wherein the adjustment condition is any value varying from a subjective food parameter of "perfectly cooked"), S300 is initiated by the remote system, wherein the remote system can present an additional set of queries that can include presentation of a series of foodstuff images captured at different times during the cooking session in S140; and prompting the user to select the foodstuff image corresponding to the user's preferred level of "brownness" (FIG. 14). The user's image selection can be subsequently used to determine an updated set of operation instructions, using the cooking parameter values associated with the image as further described below (FIG. 23). However, updating a set of operation instructions can occur at any other suitable time, such as during a cooking session for dynamic control of oven operation described in U.S. application Ser. No. 15/147,705 filed 5 May 2016 and incorporated in its entirety by this reference, and/or can be triggered using any other suitable metric or condition.

3.3.1 Cooking Parameter Models

In variations, updated operation instructions are generated by cooking parameter models (e.g., via adjustment module 70) implemented by the processor of the computing system. The model can be generic, specific to a food class, specific to a user, specific to an appliance, specific to a population (e.g., users sharing a common parameter, such as geography), or otherwise associated with any suitable population. Population-specific models can be trained on data associated with (e.g., tagged with, generated by, etc.) the population, but can alternatively include rules or equations specific to the population (e.g., empirically determined), or otherwise be tailored toward the population.

Cooking parameter models can include: probabilistic properties, heuristic properties, deterministic properties, and/or any other suitable properties. In a first variation, applying a cooking parameter model can include applying a specific quantitative value (e.g., subjective food parameter value) on a common scale to different feedback values (via different feedback indicators) received as subjective food parameters, cooking parameter values, and/or other suitable parameters, in determining updated operation instructions. For example, as shown in FIG. 16 and FIG. 23, the method can include: applying a first subjective food parameter value to a first feedback value (e.g., a value of 1 for a feedback value of "not crispy" for subjective food parameter: "crispiness") and a second subjective food parameter value to a second feedback value (e.g., a value of 3 for a feedback value of "slightly undercooked" for subjective food parameter: "doneness") (e.g., via feedback module 60); and mapping the determined subjective food parameter values to changes in target cooking parameter values (e.g., determining a change in broil temperature setting mapped from the "crispiness" value; determining a change in cooking time mapped from the "doneness" value, etc.) (e.g., via adjustment module 70). The mapping between a subjective food parameter value and a target cooking parameter value change can be: calculated, selected from a chart or graph, output by an adjustment model, iteratively refined, or otherwise determined. For example, when the subjective food parameter value (e.g., "perfection") is a negative number (e.g., "−1" indicating slight imperfection, "−10," indicating high dissatisfaction), the target cooking parameters and/or values thereof can be iteratively adjusted (e.g., by a unit change) until the subjective food parameter value is neutral or positive. However, converting feedback values for subjective food parameters into discrete subjective food parameters, and mapping subjective food parameters into changes to target cooking parameter values of an updated set of operation instructions can be performed in any suitable manner.

In a second variation, the cooking parameter model can include a cooking parameter machine learning model, which can be trained and/or executed using any of the algorithms described in relation to U.S. application Ser. No. 15/147,705 filed 5 May 2016, which is incorporated in its entirety by this reference, but can alternatively or additionally be executed using any other suitable algorithm. In a first example, the cooking parameter models can be updated with training samples including subjective food parameter values extracted from feedback values for subjective food parameters associated with a completed cooking session (e.g., through recorded cooking parameter values) and/or a label based on the feedback values (e.g., a label of "slightly overdone" corresponding to recorded temperature parameters and airflow parameters). In a second example, a cooking parameter neural network model (e.g., convolutional neural network model) can be generated using foodstuff features (e.g., extracted from images of the foodstuff captured by an optical sensor of the oven) for the neural input layer (e.g., where the corresponding label can be based on the feedback values for the cooking session associated with the images). However, applying cooking parameter machine learning models can be performed in any suitable manner.

In a third variation, different cooking parameter models can be used for different users (e.g., different cooking parameter models for different user subgroups, such as for a user subgroup that prioritizes a cooking time oven parameter over a particular target food output condition, foodstuff parameters (e.g., different cooking parameter models for mapping "brownness" to target operation parameters versus mapping "doneness"; etc.), ovens (e.g., different cooking parameter models that accept different inputs based on the types of sensors included in a particular oven type), and/or any other suitable criteria.

In a fourth variation, a plurality of cooking parameter models can be chained. For example, the method can include: classifying a food class for a food type based on optical sensor data using a foodstuff classification model; and inputting the food class (and/or other suitable parameters) into a cooking parameter model to determine target cooking parameter values; and/or associating the target cooking parameter values with the food class. However, any number of cooking parameter models and/or other suitable models can be applied in any suitable manner.

3.3.2 Mapping Feedback Values to Operation Instruction Adjustments

The computing system can determine the manner in which operation instructions should be adjusted by correlating subjective parameter values processed from user-provided feedback values (regarding subjective food parameters relating to the target food output condition) with operation parameters. The association amongst subjective food parameter values and operation instruction adjustments can be the same or different for different food classes (e.g., increasing cookie crispness can map to holding the foodstuff at a longer time at the initial temperature, while increasing chicken skin crispness can map to holding the foodstuff at a higher temperature). However, determination of operation instruction adjustments can be performed in any other suitable manner. For example, operation instructions can be adjusted automatically by a cooking parameter model implemented by the computing system, which can optionally automatically suggest to the user a set of adjustments to cooking instructions based on food class and user ID, historical preferences for similar food classes, or any other suitable information, as described in U.S. application Ser. No. 15/147,705 filed 5 May 2016 and incorporated in its entirety by this reference.

In a first variation, updating operation instructions can include updating target cooking parameter values for the set of operation instructions (e.g., oven output for a set of operation instructions) associated with a feedback value for a subjective food parameter. In a specific example, the method can include: updating a temperature cooking parameter value associated with an initial set of operation instructions (e.g., 350° F. for "crisp" cooking preset), based on feedback values for a first cooking session with the foodstuff parameters (e.g., updating the "crisp" cooking preset by increasing the temperature parameter from 350° F. to 360° F. in response to receiving a "very chewy" feedback value after a completed cooking session with a target food output condition of "crisp" specified by the user prior to the cooking session); controlling an oven according to the updated temperature cooking parameter value for a second cooking session with the updated cooking preset including the updated set of operation instructions (e.g., "crisp"); and re-updating the temperature parameter based on feedback values after the completed second cooking session (e.g., in response to receiving a "slightly chewy" feedback value, increasing the temperature parameter from 360° F. to 370° F.).

In a first example, the method can include: generating a map between "doneness" feedback values to target cooking parameters (e.g., mapping an "underdone" feedback value to a 375° F. target temperature for a future cooking session, and an "overdone" feedback value to a 350° F. target temperature for the future cooking session); and determining the target operation parameters based on the map and received feedback values.

In a second example, the method can include: receiving an image selected by the user (e.g., images captured by the optical sensor of the oven during a cooking session; stock images; etc.) and corresponding to a preferred brownness level; and determining new target cooking parameter values associated with the preferred level of brownness (e.g., recorded cooking parameter values at a time within a predetermined range of the timestamp associated with the image; etc.).

In a third example, the feedback values collected in a query response to a single subjective parameter query (e.g., a feedback value of "medium rare" for steak "doneness") can be further correlated with additional subjective food parameters (e.g., "brownness", "sizzle volume" level), wherein the feedback values can be mapped to various operation parameter updates (e.g., different cooking parameter values such as: internal meat temperature, oven cavity temperatures, color of meat surface, sound within the oven cavity chamber, etc.), or otherwise used.

In a second variation, updating cooking parameters can include updating a first operation parameter associated with a second operation parameter. For example, the method can include updating a heating element parameter associated with the "Broil" operation parameter, based on feedback values (e.g., reducing the number of activated heating elements proximal the oven top in response to receiving a plurality of "overdone" feedback values for cooking sessions operated with the "Broil" operation parameter; etc.). However, updating operation parameters and their associations can be performed in any suitable manner.

In another example, updating target operation parameters can be based on multiple feedback values corresponding to distinct cooking sessions. In a specific example, the method can include: receiving first operation parameters (e.g., 5 minute cycle of low and high heat) and first feedback values (e.g., "very undercooked") for a first cooking session; receiving second operation parameters (e.g. 6 minute cycle of low and high heat) and second feedback values (e.g., "slightly overcooked") for a second cooking session; and generating target operation parameters (e.g., a cycle of low and high heat between 5 and 6 minutes) based on the first and second operation parameters and the first and second feedback values.

In a third variation, updating operation instructions can include updating cooking parameter values associated with a user subgroup (e.g., selected based on demographics, feedback values, user preferences, cooking sessions associated with the subgroup, etc.). For example, the method can include: identifying a user subgroup based on a shared characteristic (e.g., each user has selected a default "crispy" cooking preset prior to cooking); for a set of cooking sessions, receiving recorded operation parameters (e.g., associated with target operation parameters for the "crispy" cooking preset) and feedback values for completed cooking sessions for a foodstuff type (e.g., "chicken") from users of the user subgroup; and in response to the feedback values satisfying a threshold condition (e.g., reviews of the "chicken" as "perfectly crispy"), setting the recorded operation parameters as the updated target operation parameters for future cooking sessions with the user subgroup and the foodstuff type. In an example, multiple cooking instructions can be received from multiple users cooking similar foodstuff in their respective ovens, wherein the remote computing system can generate a new set of common cooking instructions for the foodstuff class based on the multiple users' cooking instructions. The new set of common operation instructions can be subsequently pushed to all ovens, the respective ovens, or any other suitable oven, wherein the receiving ovens subsequently use the new set of common operation instructions to cook the food class. The new set of common cooking instructions can be an average of the received updated operation instructions, the most popular cooking instructions (e.g., cooking instructions shared between the received instructions), or be otherwise determined. However, the method can otherwise utilize the cooking instructions received from the user device associated with a single user, and/or a plurality of user devices associated with a user population.

In another example, updating target operation parameters can be based on operation parameters specified by third-party sources (e.g., user-uploaded recipes; recipes from the Internet; third-party databases including operation parameters associated with foodstuff parameters; etc.). However, updating cooking parameters associated with users can be performed in any suitable manner.

In a fourth variation, updating operation instructions can include empirically determining target cooking parameter values (e.g., for a target food output condition) through iteratively testing randomly selected cooking parameters. For example, a target temperature parameter (e.g., for a "pork chop" foodstuff type) can be increased by a randomly selected amount (e.g., a temperature amount randomly selected from between 1 to 10° F.) in response to each receipt of a feedback value of "no" for a question of "perfect doneness?", where the process can be iteratively repeated until receiving a feedback value of "yes".

In a fifth variation, updating operation instructions can be achieved manually by a user, a secondary user, or any other suitable user.

In a sixth variation, updating operation instructions can be based on auxiliary system parameters (e.g., operation parameters). In a first example, the method can include: receiving recorded auxiliary system parameters (e.g., sous vide system operation parameters), recorded oven operation parameters, and a feedback value for a cooking session using both the auxiliary system and the oven; and updating the oven operation parameters based on the recorded auxiliary system parameters (e.g., adjusting the oven operation parameters by an adjustment factor determined based on the sous vide system operation parameters; etc.). In a second example, the method can include determining target operation parameters for the auxiliary system (e.g., in addition to target operation parameters for the oven in a cooking session including operation of both the auxiliary system and the oven; etc.). However, updating target operation parameters can be based on any suitable criteria (e.g., users, ovens, etc.) and performed in any suitable manner.

3.3.3 Storing Updated Operation Instructions

Updated operation instructions can be preferably stored at database of the computing system in association with and applied in relation to any other suitable data and/or system component. In a first variation, updated cooking parameters can be obtained by the oven in a pull communication framework. For example, operation instructions and corresponding associations can be stored and updated at the remote system, where the operation instructions are pulled (e.g., by the oven; by the user device; etc.) from the remote system in response to a trigger event (e.g., detecting a food class associated with the operation instructions in response to user insertion of the foodstuff into the oven, based on sensor data collected by the sensor system; a user selecting an oven parameter such as "Bake" associated with the operation instructions; initiation of the cooking session; etc.). In a second variation, updated operation instructions can be pushed to and stored at the oven (e.g., directly to a WiFi-connected oven; through an intermediary user device; etc.), such as at predetermined time intervals, in response to a trigger event (e.g., updating of the operation instructions; detecting an inactive state of the oven based on recorded oven parameters below a threshold; etc.), and/or at any suitable time. In a third variation, updated operation instructions and associated cooking parameter values can be pushed to and stored at the manufacturer cloud database, which can store and process information from multiple users and/or multiple ovens. Additionally or alternatively, updated operation instructions can be stored and/or applied in relation to ovens (e.g., updating operation parameters for specific oven types, etc.), auxiliary systems (e.g. updating operation parameters for an auxiliary sous vide system), and/or any other suitable entity.

Updated operation instructions can be further stored in association with a selected image, a set of images, a food class, a cooking session ID, a user profile, a subjective food parameter and/or any other suitable information related to the initial operation instructions from which the updated operation instructions originated.

In a specific example, the method can include, after completion of a cooking session: presenting a first subjective parameter query for the first foodstuff in association with a first set of images (e.g., of the in-situ foodstuff recorded during the cooking session), wherein the first subjective parameter query and first set of images are associated with a first session identifier; in response to the first query response satisfying an adjustment condition (e.g., "unsatisfied," query response falling below a threshold value, etc.), determining an updated set of operation instructions, comprising: presenting a second subjective parameter query based on the first query response; receiving a second query response to the second subjective parameter query; associating the second query response with the first session identifier; identifying the set of operation instructions used during the cooking session, based on the first session identifier; and generating an updated set of operation instructions by adjusting the set of operation instructions based on the second query response, wherein the updated set of operation instructions are stored in association with the first food class. However, updating cooking parameters can be performed in any suitable manner.

3.4 Debugging Hardware/Software

Figure 25:
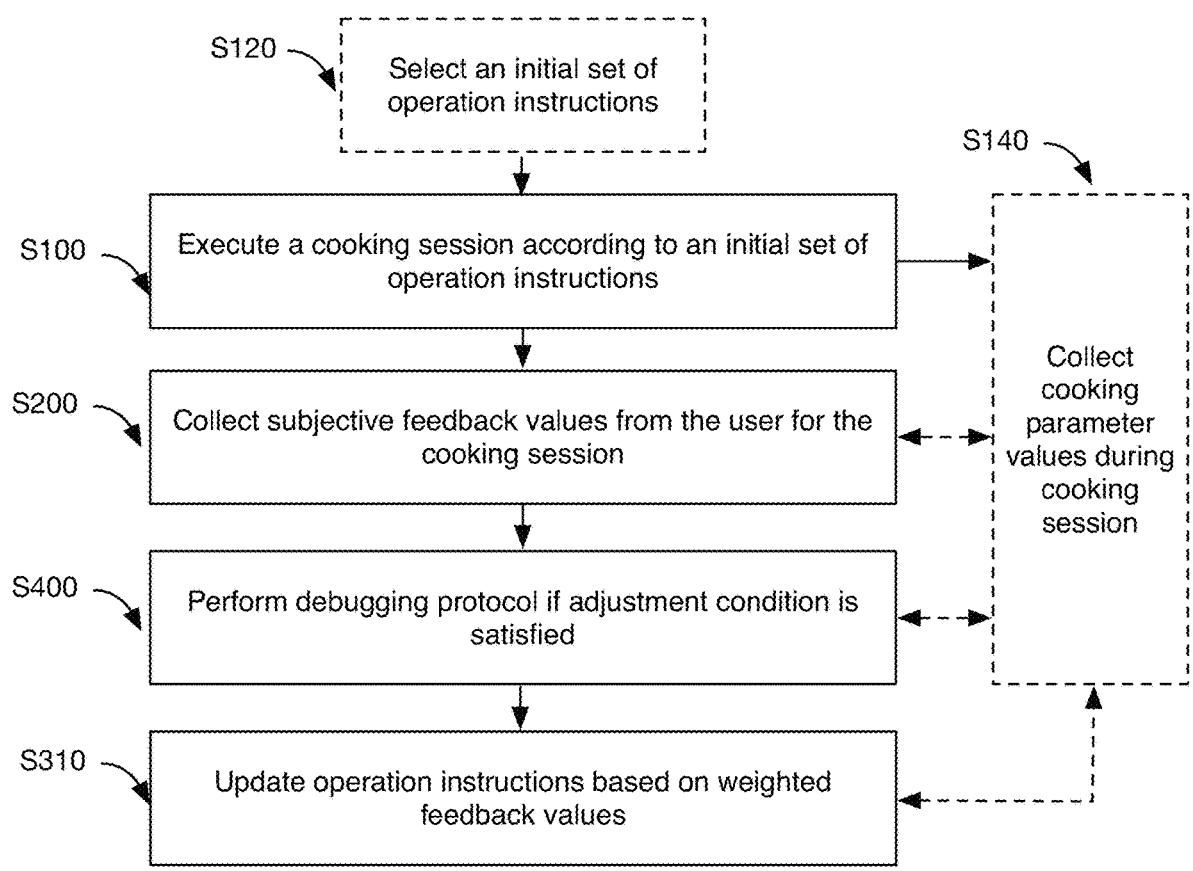
FIG. 25 is a flowchart of a variation of an embodiment of a method.

The method can optionally include implementing a debugging protocol in S400 (FIG. 25) which functions to determine whether an unsatisfactory feedback value was due to operation error source (e.g., hardware or software errors), or a need for the operation instructions to be adjusted.

The debugging protocol of the method is preferably initiated after an adjustment condition has been satisfied (e.g., based on collected feedback values from a user, such as: negative feedback, food output condition did not satisfy the target food output condition, etc.). The debugging protocol is preferably executed after completion of a cooking session, but can optionally be executed during the cooking session or at any other suitable time. However, the debugging protocol can be otherwise initiated. In a first variation, the debugging protocol is performed constantly (e.g., in real time, concurrently during the cooking session). In a second variation, the debugging protocol is triggered at a predetermined time, for regularly scheduled maintenance. However, the debugging protocol can be performed in response to any other suitable trigger event (instructed by the user, instructed remotely by the manufacturer, upon a safety alert, by an auxiliary device), and at any time, and/or frequency.

The error source can be local (e.g., for a particular system and user), and alternatively, global (e.g., for a plurality of systems and users). In an example, the debugging protocol is triggered by aggregate negative feedback from multiple users, wherein the number of negative feedback responses exceeds a frequency threshold. In this variation, the system determines whether there is a common hardware or software error that applies to multiple users. In variations, the same error can be detected in multiple sessions from multiple ovens. In a second variation, a consistent error can be detected across multiple cooking session for the same oven. However, identifying global error sources can be performed in any other suitable manner.

The debugging protocol is preferably performed at the onboard processing system of the oven (e.g., appliance processing system), but can additionally and/or alternatively be performed at the remote computing system, the user device, a global server, and any other suitable device.

In an example, the debugging protocol can include: analyzing cooking parameter values recorded during the cooking session (e.g., images) for a potential error source; upon detection of a potential error source, generating a debugging alert relating to the potential error source; transmitting the debugging alert and the set of images to a central management subsystem (e.g., a global server, remote computing system); and when a potential error source is not detected, generating the updated set of operation instructions. However, the debugging protocol can be performed in any other suitable way using any other suitable system components.

Determining that an unsatisfactory feedback value is due to a hardware and/or software error can be achieved by analysis of recorded sensor signals sampled during the cooking session (e.g., the cooking parameter values) using a computer-implemented model (error determination modules) (e.g., error source probability is calculated based on variances between target cooking parameter values and recorded cooking parameter values, etc.). In a first example, a user feedback value indicating "undercooked" can be combined with oven parameters (e.g., a low food weight at a first side of the oven, and an high food weight at a second side of the oven) can help the system determine that specific hardware component of the oven (e.g., a particular set of heating elements at the second side of the oven) was not operating properly (e.g., insufficient provision of power to the particular set of heating elements). In this variation, a specific error determination module can be used for a specific types of error sources. However alternatively, the same error determination module can be used for multiple types of error sources. In a second example, the presence of an error source can be determined based on pattern matching of the differences between actual and expected results for a food output condition (e.g., difference pattern matches predetermined pattern associated with a known error source). In an example, unexpected uneven browning of a foodstuff (determined by image analysis), can be correlated to an error source in the heating elements located in areas proximal where uneven browning of the foodstuff occurred.

In a second variation, detection of an error source is based on multiple debugging alerts generated for the same error source (e.g., repeated notification of a hardware failure over a specific range of time). However, detection of an error source can be performed in any other suitable manner.

The debugging protocol can optionally include, upon detection of an error source, assigning a weight to the feedback values from the query response based on the error source, wherein the adjustments to the operation instructions are based on the weight applied to the feedback values. Furthermore, the weighted feedback values can be used by the system to update operation instructions. In an example, upon detection that a particular subset of heating elements is not receiving sufficient power, the computing system can adjust the operation instructions to increase the apparent temperature of the heating elements in order compensate for a lower heating efficiency of the heating elements.

Upon detection of an error source, the method can include generating a debugging alert, which functions to notify the user and/or the manufacturer (via remote server) that there is an error source. In a first variation, debugging alerts to a user can be received at the user device or on-oven user interface as push notifications, reminders, sounds, or lights. However, debugging alerts can be any suitable form, occurring at any suitable frequency (e.g., until the error source has been acknowledged, at an elapsed time after the alert was transmitted), and be implemented by any suitable system component. In a second variation, debugging alerts can be transmitted from the oven, a user device, or the computing system (local) to a remote server (e.g., the manufacturer, a central server (global) that can communicate with a population of users).

The method and system of the embodiments and variations thereof can be embodied and/or implemented at least in part as a machine configured to receive a computer-readable medium storing computer-readable instructions. The instructions are preferably executed by computer-executable components preferably integrated with the system and one or more portions of a processor and/or controller 430. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes, where the method processes can be performed in any suitable order, sequentially or concurrently.

As a person skilled in the art of will recognize from the previous detailed description and from the figures and claims, modifications and changes can be made to the preferred embodiments of the invention without departing from the scope of this invention defined in the following claims.

I claim:

1. A method for cooking apparatus operation, comprising:
at a cooking apparatus, cooking a plurality of food items in a plurality of cooking sessions, each cooking session associated with a different session identifier;
during each cooking session of the plurality:
cooking the respective food item according to a set of operation instructions associated with a food class, wherein the food item is associated with the food class;
associating the set of operation instructions with the respective session identifier;
recording an image of the food item with a camera mounted within the cooking apparatus; and
storing the image in association with the respective session identifier;
after completion of a cooking session, presenting images from the plurality of cooking sessions at a remote user interface, wherein each image is presented with a subjective parameter query for the respective food item, wherein each subjective parameter query is associated with the respective session identifier associated with the image;
at the remote user interface, receiving a query response to the subjective parameter query from the user, the query response comprising a feedback value for a subjective food parameter;
associating the feedback value with the session identifier associated with the subjective parameter query;
identifying the set of operation instructions based on the session identifier;
generating an updated set of operation instructions for the food class by adjusting a cooking parameter value within the set of operation instructions based on the feedback value;
at the cooking apparatus, cooking a second food item from the food class according to the updated set of operation instructions; and
storing the updated set of operation instructions in association with the food class associated with the food item.

2. The method of claim 1, further comprising, for each cooking session of the plurality of cooking sessions, recording a set of images of the food item during the cooking session, wherein each image of the set of images is associated with an image timestamp, and wherein an image of the set of images is associated with executed operation instructions performed up to the respective image timestamp.

3. The method of claim 2, wherein each image of the set of images is further associated with a respective subjective food parameter based on at least one of the respective image timestamp and the feedback value of the query response, the method further comprising, storing the updated set of operation instructions in association with the subjective food parameter associated with the selected image.

4. The method of claim 2, wherein the subjective parameter query comprises a subset of the set of images recorded during the cooking session.

5. The method of claim 4, wherein the query response comprises a selection of an image of the subset of images, wherein the updated set of operation instructions terminates at a last executed operation instruction associated with the selected image.

6. The method of claim 2, further comprising, upon the query response satisfying an adjustment condition, initiating a debugging protocol, comprising:
 analyzing the set of images recorded during the cooking session for a potential error source;
 upon detection of a potential error source, generating a debugging alert relating to the potential error source;
 transmitting the debugging alert and the set of images to a central management subsystem; and
 when a potential error source is not detected, generating the updated set of operation instructions for the food class.

7. The method of claim 1, wherein the feedback value comprises a metric associated with doneness of the food item.

8. The method of claim 1, wherein the query response is stored in association with a user identifier, wherein the updated operation instructions for the food class are generated for the user identifier, and wherein the updated operation instructions are generated from a plurality of query responses associated with the user identifier for a plurality of cooking sessions associated with the same food class.

9. The method of claim 1, wherein the query response is stored in association with a user identifier, wherein the updated operation instructions for the food class are generated for a user population, and wherein the updated operation instructions are generated from a plurality of query responses associated with a plurality of user identifiers for a plurality of cooking sessions associated with the same food class.

10. The method of claim 1, further comprising automatically determining the set of operation instructions for cooking the food item, comprising:
 using the camera of the cooking apparatus, recording a reference image of the food item; and
 determining a food class for the food item based on the reference image; wherein the set of operation instructions is retrieved based on the determined food class.

11. The method of claim 1, further comprising, in response to receiving a historical dataset for the food class, generating a predicted temporal profile comprising an estimated timepoint at which the food item achieves a target food output condition indicated by the user.

12. A method to improve food preparation using a cooking apparatus including a cooking cavity and a camera directed toward the cooking cavity, comprising, at a remote user device:
 initiating a first cooking session for a first food item, wherein the first cooking session comprises: cooking the first food item at the cooking apparatus according to an initial set of operation instructions associated with a first food class for the first food item, and simultaneously recording a first set of images of the first food item with the camera during cooking, wherein the first set of images is stored in association with a first session identifier for the first cooking session;
 after completion of the first cooking session, presenting a first subjective parameter query for the first food item in association with the first set of images, wherein the first subjective parameter query is associated with the first session identifier associated with the first set of images; and
 determining an updated set of operation instructions in response to a first query response falling below a threshold value, comprising:
  presenting a second subjective parameter query based on the first query response;
  receiving a second query response to the second subjective parameter query;
  associating the second query response with the first session identifier; and
  transmitting instructions to an instruction subsystem to generate an updated set of operation instructions by adjusting the initial set of operation instructions associated with the first session identifier based on the second query response, wherein the updated set of operation instructions are stored in association with the first food class.

13. The method of claim 12, wherein each image of the set of images is associated with an image timestamp, and wherein an image of the set of images is associated with executed operation instructions performed up to the respective image timestamp.

14. The method of claim 13, further comprising initiating a second cooking session for a second food item associated with the first food class, comprising:
 presenting the user with the first set of images;
 receiving, from the user, a selected image from the first set of images, wherein the selected image reflects user preference of target food output condition for the second food item, and is associated with a subset of the set of operation instructions executed up to the image timestamp; and
 at the cooking apparatus, cooking the second food item according to the subset of the set of operation instructions associated with the selected image.

15. The method of claim 13, wherein the subjective parameter query comprises a subset of the set of images recorded during the cooking session.

16. The method of claim 15, wherein the query response comprises a selection of an image of the subset of images, wherein the updated set of operation instructions terminates at a last executed operation instruction associated with the selected image, and further comprising storing the updated set of operation instructions in association with a subjective parameter value associated with the selected image.

17. The method of claim 12, further comprising automatically determining the set of operation instructions for cooking the food item, comprising:
 using the camera of the cooking apparatus, recording a reference image of the food item; and
 determining a food class for the food item based on the reference image; wherein the set of operation instructions is retrieved based on the determined food class.

18. The method of claim 12, wherein the first and the second query responses are stored in association with a user identifier, wherein the updated operation instructions for the first food class are generated for a user population, and wherein the updated operation instructions are generated from a plurality of query responses associated with a plurality of user identifiers for a plurality of cooking sessions associated with the first food class.

19. A method for cooking apparatus operation, comprising:
- at a cooking apparatus, cooking a plurality of food items in a plurality of cooking sessions, each cooking session associated with a different session identifier;
- during each cooking session of the plurality:
  - cooking the respective food item according to a set of operation instructions associated with a food class, wherein the food item is associated with the food class;
  - associating the set of operation instructions with the respective session identifier;
  - recording an image of the food item with a camera mounted within the cooking apparatus; and
  - storing the image in association with the respective session identifier;
- after completion of a cooking session, presenting images from the plurality of cooking sessions at a remote user interface, wherein each image is presented with a subjective parameter query for the respective food item, wherein each subjective parameter query is associated with the respective session identifier associated with the image;
- at the remote user interface, receiving a query response to the subjective parameter query from the user, the query response comprising a feedback value for a subjective food parameter, wherein the feedback value comprises a metric associated with doneness of the food item;
- associating the feedback value with the session identifier associated with the subjective parameter query;
- identifying the set of operation instructions based on the session identifier;
- generating an updated set of operation instructions for the food class by adjusting a cooking parameter value within the set of operation instructions based on the feedback value; and
- at the cooking apparatus, cooking a second food item from the food class according to the updated set of operation instructions.

* * * * *